(12) United States Patent
Matsumori et al.

(10) Patent No.: US 7,965,370 B2
(45) Date of Patent: Jun. 21, 2011

(54) LIQUID CRYSTAL DISPLAY DEVICE

(75) Inventors: Masaki Matsumori, Tokai (JP); Ayami Ohsato, Hitachinaka (JP); Yasushi Tomioka, Hitachinaka (JP)

(73) Assignee: Hitachi Displays, Ltd., Chiba (JP)

( * ) Notice: Subject to any disclaimer, the term of this patent is extended or adjusted under 35 U.S.C. 154(b) by 44 days.

(21) Appl. No.: 12/254,876

(22) Filed: Oct. 21, 2008

(65) Prior Publication Data

US 2009/0103018 A1    Apr. 23, 2009

(30) Foreign Application Priority Data

Oct. 22, 2007  (JP) .................................. 2007-274240

(51) Int. Cl.
*G02F 1/1333*  (2006.01)
(52) U.S. Cl. .......................................... 349/158; 349/96
(58) Field of Classification Search .................. 349/158
See application file for complete search history.

(56) References Cited

U.S. PATENT DOCUMENTS

| 6,337,111 | B1 * | 1/2002 | Ichihashi | 428/1.31 |
| 6,645,681 | B2 * | 11/2003 | Andrews et al. | 430/7 |
| 2003/0016199 | A1 | 1/2003 | Lee et al. | |
| 2006/0066788 | A1 * | 3/2006 | Utsumi et al. | 349/120 |
| 2007/0160778 | A1 * | 7/2007 | Matsumori et al. | 428/1.2 |

FOREIGN PATENT DOCUMENTS

| JP | 2003-029724 | 1/2003 |
| JP | 2006-091393 | 4/2006 |

OTHER PUBLICATIONS

Silverstein et al., "Thin Crystal Films (TCF) for LCD Color Correction", SID Symposium Digest of Technical Papers, vol. 34, Issue 1, pp. 824-827, May 2003.

* cited by examiner

*Primary Examiner* — Mark A Robinson
*Assistant Examiner* — Eric Wong
(74) *Attorney, Agent, or Firm* — Antonelli, Terry, Stout & Kraus, LLP.

(57) ABSTRACT

A glass substrate (101) being an active matrix substrate and a resin film substrate (102) being a counter electrode are opposingly arranged on a surface of an alignment layer 132, and a liquid crystal layer (110A) is arranged therebetween. Each of polarizing plates (118, 119) is formed on an outer surface of the glass substrate (101) and the resin film substrate (102) forming a counter electrode. An uniaxial absorption anisotropy is imparted to the resin film substrate (102).

19 Claims, 11 Drawing Sheets

LIQUID CRYSTAL DISPLAY DEVICE

CROSS-REFERENCE TO RELATED APPLICATION

The present application claims priority from Japanese application JP2007-274240 filed on Oct. 22, 2007, the content of which is hereby incorporated by reference into this application.

BACKGROUND OF THE INVENTION

1. Field of the Invention

The present invention relates to a liquid crystal display device, and more particularly, to a liquid crystal device in which blueness is suppressed in black display, to thereby improve a contrast of display.

2. Description of the Related Art

The liquid crystal display device has such characteristics as having a high display quality, and being thin and low power consumption. Owing to those advantages, its applications are widened to various fields. In recent years, along with enlargement of its applications as monitors for mobile devices such as a mobile phone and a digital still camera, monitors for a desktop personal computer, monitors for printing and designing, monitors for a medical use, and further for liquid crystal televisions, there are increasing demands for excellent color reproducibility and a high contrast ratio. In particular, in the liquid crystal televisions, greater importance is placed on expression of a black color, and high luminance is also strongly required therefor.

A preference for color tone greatly influences on the image quality of the liquid crystal television. For example, in Japan, white display in the liquid crystal television is not set as an achromatic color in chromatics, but may sometime be set to 9,300 K, or further to 10,000 K or more, which being a high color temperature.

In a liquid crystal display device, which uses a pair of the polarizing plates for display, the transmission properties of a perpendicular polarizing plate and a parallel polarizing plate to be used as the polarizing plate are dominant for the white display and the black display. Specifically, a black color is affected by the perpendicular transmittance of the polarizing plate, and a white color is affected by the property of the parallel transmittance. A low perpendicular transmittance and a high parallel transmittance are required for attaining a high contrast ratio. As this type of polarizing plate, there is widely used a polarizing plate obtained by stretching an iodated base such as a polyvinyl alcohol resin. However, in a case of the polarizing plate with oriented iodine in a stretched resin, the contrast ratio in a shortwave region becomes lower in many cases. This reason is considered that it is difficult to control the order parameters of the resin and iodine completely.

Owing to this, the transmittance of the light corresponding to the shortwave region, i.e., blue region is higher in the black display and lower in the white display as compared with the transmitted light in the longwave region. When the white display is set so as to attain a high color temperature, namely, when the white display is set at a highly bluish white color, the blueness is intensified in the black display, resulting in lowering color tone reproducibility of the image in the liquid crystal televisions, in which the expression of a black color is considered important. As means for solving a color tone difference between black color and white color caused by the polarizing plate described above, a technology relating to a color tone correction polarizing plate is reported in "Silverstein, Louis D, and Paukshto, Michael V., Thin Crystal Films (TCF) for LCD Color Correction, SID 03 DIGEST (2003), pp. 824-827," and a technology for compensating a wavelength dependency of the degree of polarization shown by the polarizing plate is reported in Japanese Patent Application Laid-open No. 2006-91393. Also, Japanese Patent Application Laid-open No. 2003-29724 can be cited as a technology relating to compensating color tone in dark region on a liquid crystal display of PVA (patterned vertical alignment) mode.

Description is made of a structural example of the liquid crystal display device with reference to FIG. 1. FIG. 1 is a schematic cross-sectional view of the liquid crystal display device. Principle of the liquid crystal display device resides in that linearly polarized light which is transmitted through an input side polarizing plate 118 is caused to change its orientation direction by a liquid crystal layer, thereby changing its polarizing state, and a light quantity transmitting through an output side polarizing plate 119 is controlled to achieve display. It is ideal that there is no change in its polarizing state by the liquid crystal layer in black display, and that the light from the light source is blocked with the output side polarizing plate 119 arranged at a right angle. Accordingly, the black display is a product of an orthogonal spectral transmittance of the polarizing plate to be used and a color filter spectral transmittance. That is, the polarizing plate and the color filter are almost dominant for the black display in spite of absorption due to a substrate, an insulating layer, a transparent electrode, or the like.

The half tones and white display obtained through the transmission of light are displayed due to the transmittance of birefringent light, which is generated by the liquid crystal layer, through the output side polarizing plate 119. Therefore, in the white display, a parallel spectral transmittance of the polarizing plate to be used, the birefringent light of the liquid crystal, and a spectral transmittance of the color filter almost dominantly act thereon. However, a polarizing degree of the polarizing plate with oriented iodine in a stretched resin such as polyvinyl alcohol is lowered in a short wavelength range, and hence in the black display, the black is colored into blue, and in the white display, the transmittance of blue is lowered. On the other hand, in the black display, leakage light may generate due to light scattering or the like caused by pigment particles forming a color filter layer, or the liquid crystal layer. As a result, the luminance is increased from the luminance of the ideal black display, which causes a change in color tone of the black display.

As described above, as to the display characteristics of a liquid crystal display device using polarizing plates, the color tones of a black display and a white display are largely varied mainly by the difference in spectral characteristics between the perpendicular transmittance and parallel transmittance of the polarizing plates. In particular, the black display is remarkably influenced by the orthogonal spectral characteristics of the polarizing plates. The iodine stretching type polarizing plates commonly used at present are disadvantageous as being not possible to block the orthogonal light at about 400 nm completely, resulting in a problem of expressing bluish black color.

JP 2003-29724 A discloses a technology for correcting the color tone through the control of three pixels of RGB independently. However, in order to achromatize the blue transmitted light, the transmission amounts of the green light and the red light are required to increase. When employing this method in the black display, resulting in increasing the luminance of the black display, and hence the contrast ratio is unavoidably decreased. In the liquid crystal television, in which the expression of the black color is considered important, the inductions of the luminance increase of the black display and the contrast ratio decrease are not allowable. In addition, displaying a black color at different orientation states of crystal liquid molecules in the pixels, respectively, of RGB becomes a cause for the deterioration of viewing angle characteristics. Therefore, the above-mentioned technology is not preferred also in this point.

JP 2006-91393 A discloses a technology in which a uniaxial absorptive anisotropic layer is provided between a pair of the polarizing plates of the liquid crystal display device, to thereby compensate wavelength dependency of the degree of polarization of the polarizing plate. Owing to intensive studies of the inventors of the present invention, it is revealed that, in order to attain effects such as reduction of blueness at the time of black display and improvement of the contrast ratio of the liquid crystal display device, the absorbance and a value of a dichroic ratio of the absorption axis and a light transmission axis of the uniaxial absorptive anisotropic layer are very important. For example, if the absorbance of the transmission axis of the uniaxial absorptive anisotropic layer is high, resulting in a cause of shift of the color tone of the white display. Besides, unless the absorbance of the absorption axis of the uniaxial absorptive anisotropic layer is a given value or more, a sufficient effect may not be obtained.

In the color tone correction polarizing plate, published in the above-mentioned Silverstein et al., for achromatizing perpendicular transmittance characteristics of the polarizing plates through the arrangement of the dye showing dichromatism in the shortwave range outside the respective pair of polarizing plates, four polarizing layers are formed, and hence a process for adjusting the axes of the individual layers becomes necessary. As a result, the load on the production process is inevitably increased. Further, the fluctuation of the degree of polarization of the polarizing plates causes a non-uniform display quality, which being a problem of productivity.

SUMMARY OF THE INVENTION

It is an object of the present invention to provide a liquid crystal display device having a high image quality while suppressing blueness at a time of black display and improving a contrast ratio. In addition, improving reliability of a product as well improving productivity are also an object of the present invention.

In order to achieve the above-mentioned object, the present invention is characterized by imparting a uniaxial absorption anisotropy to one or both of a thin film transistor (TFT) substrate and a color filter (CF) substrate, which constitute a liquid crystal display device, as an optical layer having an absorption anisotropy within a light path from light emitted from a light source or taken from outside passes through an optical system of the liquid crystal display device until a viewer recognizes the light. A transparent substrate including a glass substrate, a resin substrate, a resin film substrate, or the like may be used for the TFT substrate and the CF substrate. Moreover, the anisotropic absorption is effective in improving the contrast ratio by reducing the luminance at the time of black display because the degree of polarization of the polarizing plates can be compensated by arranging the absorption axis of the anisotropic absorption substantially parallel or perpendicular to the absorption axis of the polarizing plate of the input side or the output side.

The absorption anisotropy is represented by a ratio of absorbances between an absorption axis and a transmission axis, namely, a dichroic ratio, and when the dichroic ratio is 2 or more, it is particularly effective for an improvement of the contrast ratio. In a case where an iodine-based polarizing plate is used for the polarizing plate of the liquid crystal display device, the degree of polarization of the iodine-based polarizing plate around about 380 nm to 450 nm is low compared to other visual wavelength range, and hence the uniaxial absorptive anisotropic layer is preferably has the larger absorption anisotropy in this wavelength range, thereby being effective for the suppression of blueness during the black display.

According to the present invention, the absorbance of the transmission axis of the uniaxial absorptive anisotropic layer is preferably 0.1 or less, more preferably 0.07 or less, and particularly preferably 0.04 or less. In this case, the uniaxial absorptive anisotropic layer has almost no influence on the white display, and hence excellent display may be obtained either in the white display or in the black display.

Further, according to the present invention, a difference of absorbances between a transmission axis and an absorption axis of a substrate, in one pair of the substrates of the liquid crystal display device, on which the uniaxial absorptive anisotropic layer is formed, is preferably 0.1 or more, more preferably 0.15 or more, and particularly preferably 0.2 or more. In this case, it is effective for improving the contrast ratio of the liquid crystal display device.

Further, in the present invention, the uniaxial absorption anisotropy may be imparted to a resin forming the polarizing plate. For example, after an addition of a dichroic pigment which causes photoisomerization, such as an azo-based compound or a stilbene-based compound, to triacetylcellulose (TAC), which being a protective film of the polarizing plate, through irradiation of a substantially linearly polarized light and/or stretching, the uniaxial absorption anisotropy is imparted thereto. In the photoisomerization reaction, the absorption axis is developed in a perpendicular direction with respect to the polarization axis of the irradiated polarized light. Further, in a uniaxial stretching treatment, the absorption axis is developed in parallel to a stretching direction.

Here, the dichroic pigment preferably has a linear rod-like structure having a long chemical structure, an aromatic ring constituting the compound, which has iso-planar property, and has a small number of groups participating in hydrogen bonds. Representative examples of the dichroic pigment include: polyazo-based direct dyes; C.I. Direct Yellows 12 and 44; C.I. Direct Orange 39; C.I. Direct Reds 23, 28, 31, 37, 79 and 81; C.I. Direct Violets 9 and 12; C.I. Direct Blues 1, 22, 78, 90 and 151; C.I. Direct Green 1; C.I. Direct Black 17; Methyl Orange; Brilliant Yellow; Modern Yellow 10; Acid Red 97; and the like. Of these, compounds containing structures of a benzidine type, a diphenylurea type, a stilbene type, a dinaphthylamine type, a J-acid type or an anthraquinone type are preferred. The present invention is characterized by adding those compounds in combination so that the degree of polarization and the color tone of the polarizing plate may be compensated for.

Further, in the present invention, a method of imparting alignment ability to an alignment layer is not particularly limited. As the method of imparting the alignment ability, there are given a rubbing orientation process method involving rubbing the alignment layer using a buff cloth and an optical orientation method involving irradiating light contactlessly. Compared to the rubbing orientation process method, in the optical orientation method, there is no disturbance in local orientation, thereby being capable of imparting a uniform orientation over an entire surface of the display region. In addition, the dichroic pigment develops the absorption anisotropy due to the photoisomerization reaction through the irradiation of the polarizing light. Therefore, if the optical orientation method is employed, an orientation treatment of the alignment layer and the absorption anisotropy imparting process may be carried out by one process.

In particular, when a light reactive alignment layer is made of a polyimide or polyamic acid having a cyclobutane ring, the alignment layer having a high orientation-regulating ability at a low irradiation dose, thereby being effective in terms of productivity. A photoisomerization compound such as an azo-based compound or a stilbene-based compound react at a wavelength near a visible region, many of the compounds have a relatively low molecular weight, and are highly reactive, with the result that there is a problem in that a long-term reliability of a product is low when those compounds are used for the alignment layer of the liquid crystal display device.

In the present invention, those low-molecular weight compounds are used as additives of photoreactive polyimide and/or photoreactive polyamic acid, to thereby fix an oriented state of the photoisomerizable compound. This fixation is effective also from the viewpoint of product reliability.

According to the present invention, the optical anisotropy and further the uniaxial absorption anisotropy may be imparted to any one or a plurality of various components (transparent substrate) such as: a transparent resin substrate (plastic substrate), a polarizing plate protective film, and an adhesive layer of the polarizing plate, which are constituting the polarizing plate; an alignment layer; an insulating film of an active element for applying an electric field to a liquid crystal; the color filter layer; and a color filter protective insulating film.

Specifically, the impartment of the absorption anisotropy may be achieved by the addition of the dichroic pigment such as the stilbene-based compound or the azo-based compound to the above-mentioned transparent substrate, and by the irradiation of substantially linearly polarized light thereto. In a case of the transparent plastic substrate, the absorption anisotropy may also be imparted by the addition of the dichroic pigment and by stretching.

As described above, in the liquid crystal display device of the present invention, the uniaxial absorption anisotropy is imparted to at least one of the TFT substrate and the CF substrate, or the uniaxial absorption anisotropy is imparted to further one or a plurality of the various transparent substrates. As a result, there may be achieved: an improvement of the degree of polarization through assistance to the degree of polarization of the polarizing plate; a compensation of fluctuation of the degree of polarization; and a reduction of luminance of the black display and a suppression of blueness through the absorption of generated leakage light.

The transparent substrates including the TFT substrate and the CF substrate, which are used in the present invention, are not particularly limited. However, it is preferred to use a material having a high transmittance in 380 nm to 780 nm, an excellent mechanical strength, an excellent dimensional stability, and an excellent heat resistance. As the transparent substrate, there may be used a plastic material or a plastic film material such as polyethlene terephthalate (PET), polynaphthalene terephthalate (PEN), polyallylate (PAR), polyethersulfone (PES), acetyl cellulose, triacetyl cellulose (TAC), a polyimide resin, an acryl resin, a polyester resin, a polycarbonate resin, or a cyclic polyolefin resin. Note that, for the TFT substrate and the CF substrate, an inorganic material such as soda glass, alkalifree glass, borosilicate glass, or quartz may be used.

The transmittance of the plastic substrate or the plastic film substrate in 380 nm to 780 nm preferably has 70% to 100%, more preferably 85% to 100%, and particularly preferably 90% to 100%. The plastic film of the present invention may be used as a single layer, but may be used as a multilayer film having two or more layers in combination.

The polarizing plate used in the present invention is not particularly limited, but preferably has a high degree of polarization in 380 nm to 780 nm. Description is made of a polarizing plate represented by reference numeral 118 of FIG. 1. In this case, as the polarizing plate 118, there is exemplified an iodine-based polarizing plate which is generally used in the liquid crystal display device, but may be a pigment-based polarizing plate. Besides, as the orientation method, any method other than the stretching method may be used as long as developing dichroism. In a case of a polarizing plate with oriented iodine by stretching, the polarizing plate 118 includes a polyvinyl alcohol film 163 containing the iodine, polarizing plate protective films 161 and 162 for enhancing weather resistance, and an adhesive layer 164 for bonding the transparent substrate and the polarizing plate.

The polarizing plate protective film is not particularly limited, but preferably has a high transmittance in 380 nm to 780 nm, an excellent mechanical strength, an excellent heat resistance, an excellent moisture resistance, and an excellent weather resistance, and an excellent adhesive property with a dyed polyvinyl alcohol film. As the polarizing plate protective film, cellulose acetate, cellulose butyrate, or the like may be used.

An adhesive for bonding the transparent substrate and a polarlizer is not particularly limited, but preferably used is a material having a high transmittance in 380 nm to 780 nm, and a lower Tg than room temperature. Besides, there occurs a dimensional change in the polarizing plate in cases where the liquid crystal display device is left stand under high temperature, circumstance is changed from high temperature and high humidity to low temperature and low humidity, a backlight is continuously lighted, or the like. Along with this dimensional change, foaming of the adhesive layer or separation from the adherend such as the liquid crystal cells are liable to occur. The adhesive layer, which is improved by increasing a molecular weight of an adhesive agent or by increasing a degree of crosslinking so as to endure with use under severe conditions described above, is preferably used.

The present invention is characterized by adding the dichroic pigment to the color filter layer. However, when imparting the dichroism, it is more effective to substantially match the transmission wavelength range of the color filter layer with the absorption wavelength range of the dichroic pigment.

In a case whether the above-mentioned absorption anisotropy is formed onto a substrate on a viewer side, the absorption axis is made substantially parallel with the absorption axis of the polarizing plate arranged on the viewer side, with the result that the color tone in the black display may be compensated for without largely changing the color tone in the white display, whereby the present invention may effectively act thereon.

In a case where the above-mentioned uniaxial absorption anisotropy is formed onto a substrate on a light source side (active matrix substrate 101 of FIG. 1), the absorption axis is made substantially parallel with the absorption axis of the polarizing plate on the light source side, with the result that it is possible to obtain a stability of orientation-regulating ability for a longer term, whereby the present invention may effectively act thereon.

In the present invention, there may be used, as the light source, a light emitting unit such as a cold cathode fluorescent lamp (CCFL), a light emitting diode (LED), or an organic light-emitting diode (OLED). In addition, there may be used one utilizing natural light such as sunlight. Besides, there may be used a light emitting unit in which a plurality of light emitting units each emitting light having different wavelengths such as red, blue, or green colors are combined. The present invention may effectively operate even if the light source is positioned immediately below, on a side surface, or on a front surface with respect to a viewer side of the liquid crystal panel. In a case where a longitudinal direction of a liquid crystal molecule for forming a liquid crystal layer is in parallel with a pair of substrate sandwiching a liquid crystal layer, the light leakage in the lower wavelength may be suppressed by the present invention, thereby effectively acting on an improvement of the display quality.

According to the present invention, it is possible to provide the liquid crystal display device having a high image quality with an improved contrast ratio in which the blueness in the black display in the liquid crystal display device is suppressed without an addition of new member.

DETAILED DESCRIPTION OF THE INVENTION

Hereinafter, examples of the present invention are described in detail with reference to the drawings. Note that, in the following description, a substrate having active elements such as thin film transistors formed thereon is referred to as an active matrix substrate. Further, if the substrate has a color filter as its counter electrode, it is also referred to as a color filter substrate. Besides, in the present invention, a desired contrast rasio as a target is 500:1 or more, and a target chrominance $\Delta u'v'$ between black brightness and white brightness is preferably 0.04 or less. The chrominance is measured by TOPCON Spectroradiometer SR-3.

Absorption spectra of the absorption axis and the transmission axis of the uniaxial absorption anisotropy layer are measured, and a dichroic ratio is calculated as a ratio (Aa/At) of an absorbance of the absorption axis (Aa) to an absorbance of the transmission axis (At). Besides, the difference was calculated using an expression (Aa−At). In the examples, in the spectrum of the absorption axis, a dichroic ratio and a difference at a peak wavelength in a visual wavelength range of 380 nm to 780 nm are described.

Example 1

Figure 1:
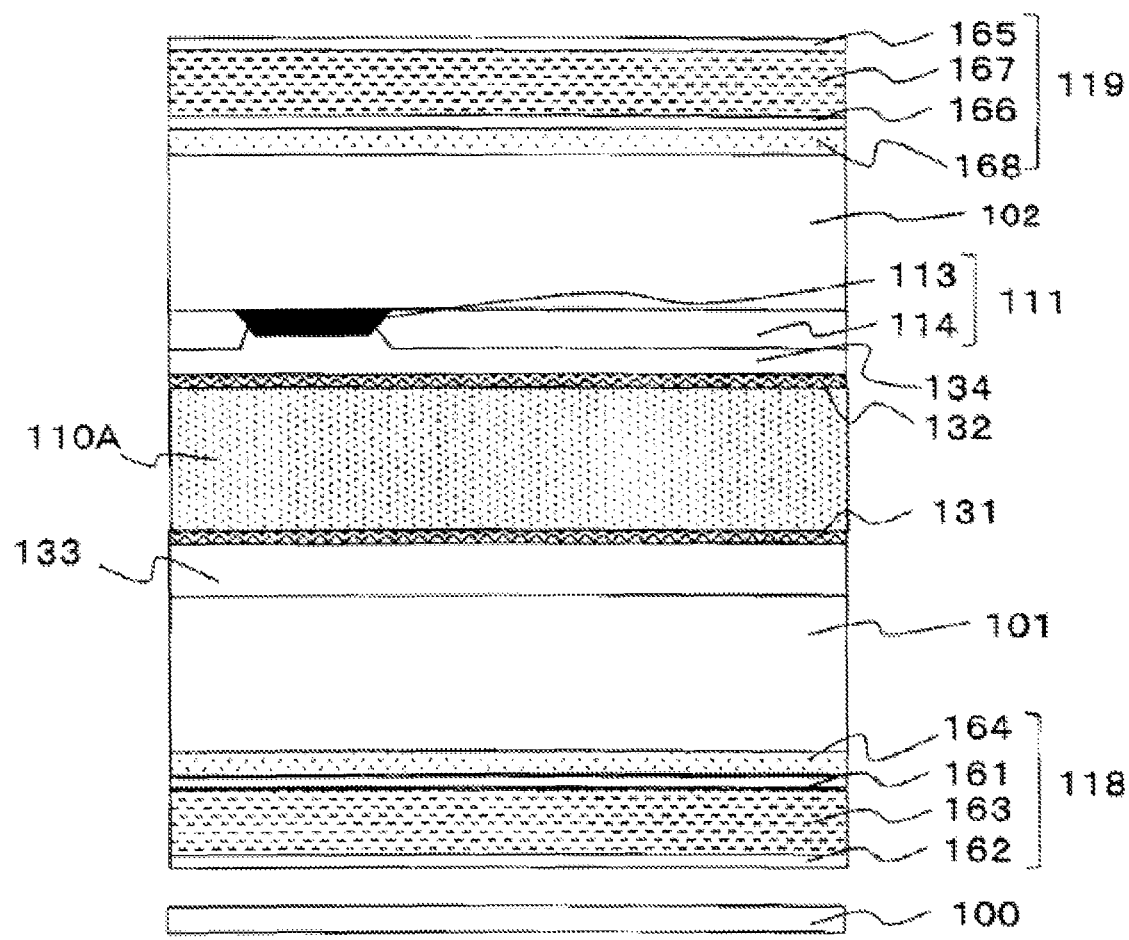
FIG. 1 is a schematic cross-sectional view of a liquid crystal display device.
Figure 2:
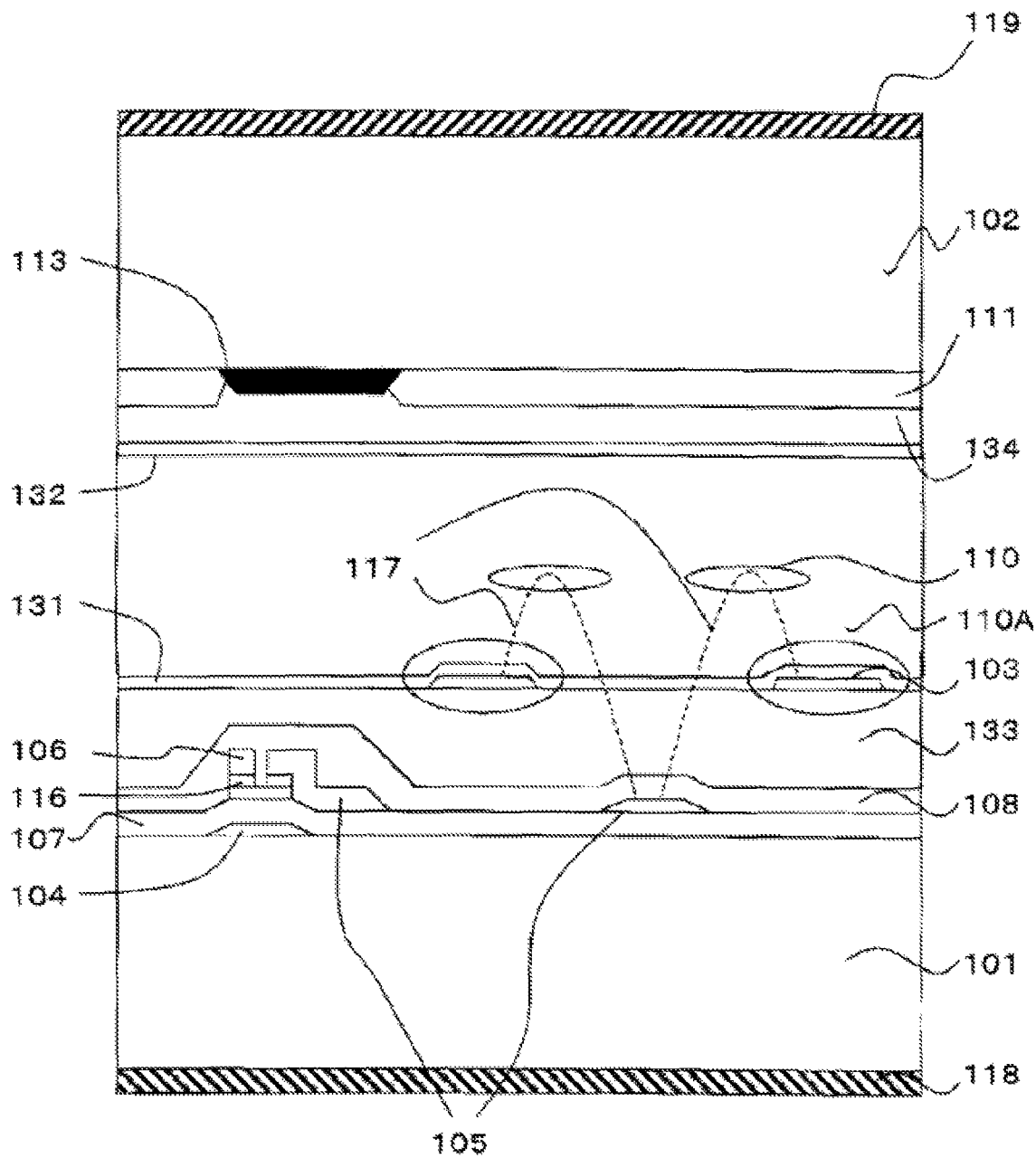
FIG. 2 is a schematic cross-sectional view illustrating a structure of a liquid crystal display device according to Example 1 of the present invention.
Figure 3A:
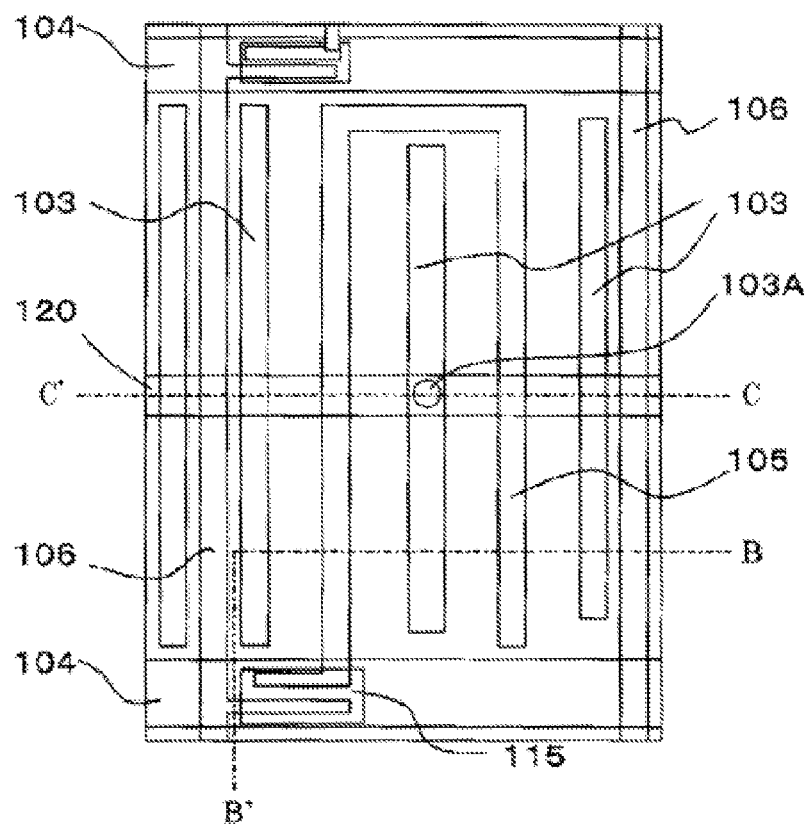
FIG. 3A is a schematic plan view of a pixel portion illustrating a pixel structure of the liquid crystal display device according to Example 1 of the present invention.
Figure 3B:
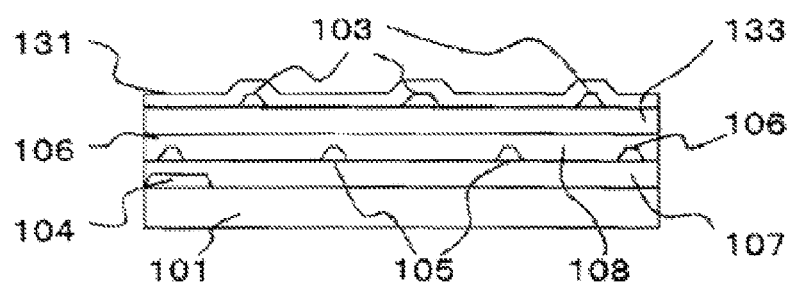
FIG. 3B is a cross-sectional view taken along the line B-B' of FIG. 3A.
Figure 3C:
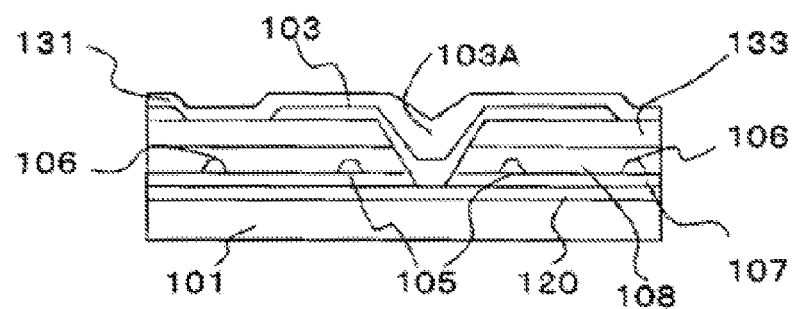
FIG. 3C is a cross-sectional view taken along the line C-C' of FIG. 3A.

FIG. 2 is a schematic cross-sectional view of a vicinity of a pixel illustrating a liquid crystal display device according to Example 1 of the present invention. FIGS. 3A to 3C are schematic views of a pixel portion illustrating a pixel structure of the liquid crystal display device according to Example 1 of the present invention. FIG. 3A is a plan view, FIG. 3B is a cross-sectional view taken along the line B-B' of FIG. 3A, and FIG. 3C is a cross-sectional view taken along the line C-C' of FIG. 3A. Note that, FIG. 2 corresponds to a part of a cross-section taken along the line B-B' of FIG. 3A. Note that, FIG. 3B and FIG. 3C schematically illustrate a structure of the main portion which is emphasized, and FIG. 3B and FIG. 3C do not correspond to the cut sections along the line B-B' and the line C-C', one-to-one. For example, in FIG. 3B, a semiconductor film 116 is not illustrated, and in FIG. 3C, only one through-hole connecting a counter electrode and a common wiring 120 is illustrated as a representative.

In the liquid crystal display device of this example, on top of a glass substrate 101 serving as an active matrix substrate, a gate electrode (scanning signal electrode) 104 made of Cr (chromium) and a common wiring (common electrode wiring) 120 are arranged, and a gate insulating film 107 made of silicon nitride is formed so as to cover the gate electrode 104 and the common electrode wiring 120. Further, on top of the gate electrode 104, a semiconductor film 116 made of amorphous silicon or polycrystalline silicon is arranged through the gate insulating film 107 so as to function as an active layer of a thin film transistor (TFT) as an active element. A drain electrode (picture signal wiring) 106 made of Cr.Mo (chromium/molybdenum) and a source electrode (pixel electrode) 105 are arranged so as to overlap with a portion of the pattern of the semiconductor film 116, and a protective film 108 made of silicon nitride is formed so as to cover all of them.

As schematically illustrated in FIG. 3C, common electrodes 103 connected to the common electrode wiring 120 through a through-hole 103A formed by perforation of the gate insulating film 107 and the protective film 108 are arranged on top of an over coat layer (organic insulating film) 133. As can be seen from FIG. 3A, the common electrodes 103 drawn out from the common electrode wiring 120 through the through-hole 103A is formed so as to face the pixel electrodes 105 in the region of one pixel in a plane.

The glass substrate 101 is an active matrix substrate (TFT substrate), and a substrate 102 is a color filter substrate (CF substrate). The CF substrate 102 is formed of a resin film base (resin film substrate). In Example 1, of the glass substrate and the resin film substrate, the uniaxial absorption anisotropy is imparted to the resin film substrate (color filter substrate). In Example 1, the pixel electrodes 105 are formed further under the protective film 108 which is formed under the organic protective film 133, and the common electrodes 103 are arranged on top of the organic protective film 133. A pixel is formed in a region between a plurality of the pixel electrodes 105 and a plurality of the common electrodes 103. An alignment layer 131 is formed on the surface of the active matrix substrate having the thus formed unit pixels arranged thereon in matrix, namely, the surface of the organic protective film 133 having the common electrodes 103 formed thereon.

On the other hand, as illustrated in FIG. 2, on top of a resin film substrate 102 forming a color filter substrate, a color filter layer 111 is arranged so as to be partitioned into sections for individual pixels by a light blocking portion (black matrix) 113, and the color filter 111 and the light blocking portion 113 are covered with an organic protective film 134 made of a transparent insulating material. The organic protective film 134 also serves as a planarization layer. In addition, an alignment layer 132 is formed also on top of the organic protective film 134 to constitute a color filter substrate.

The alignment layers 131 and 132 are applied with a liquid crystal alignment ability through irradiation of linear polarized ultraviolet light taken out from a high-pressure mercury lamp as a light source by use of a pile polarizer obtained by laminating quartz plates.

The glass substrate 101 constituting the active matrix substrate and the resin film substrate 102 constituting the counter electrode are arranged so as to face each other with respect to the surfaces of the alignment layers 131 and 132, respectively, and a liquid crystal layer (liquid crystal composition layer) 110A formed of liquid crystal molecules 110 is arranged between the glass substrate 101 and the resin film substrate 102. Polarizing plates 118 and 119 are formed on top of the outer surfaces, respectively, of the glass substrate 101 constituting the active matrix substrate and the resin film substrate 102 constituting the counter electrode. In this example, the uniaxial absorption anisotropy is imparted onto the resin film substrate 102.

Thus, an active matrix liquid crystal display device using thin film transistor (namely, TFT liquid crystal display device) is formed. In this TFT liquid crystal display device, when no electric field is applied, the liquid crystal compositions (liquid crystal molecules) 110 constituting the liquid crystal composition layer 110A are oriented substantially in parallel with the surfaces of the substrates 101 and 102 arranged so as to face each other, and are homogeneously oriented in an initial direction of orientation determined by a photo-alignment treatment.

In this case, when voltage is applied to the gate electrode 104 to turn on the thin film transistor (TFT), an electric field 117 is applied to the liquid crystal composition layer owing to an electric potential difference between the pixel electrodes 105 and the common electrodes 103, and the liquid crystal molecules 110 constituting the liquid crystal composition layer turn into the direction of the electric field due to an interaction between the dielectric anisotropy of the liquid crystal composition and the electric field. At this time, the light transmittance of this TFT liquid crystal display device is varied by the refraction anisotropy of the liquid crystal composition layer and the action of the polarizing plates 118 and 119, whereby display can be carried out.

In the organic insulating films 133 and 134, there may be used thermosetting resins such as acrylic resins, epoxyacrylic resins and polyimide resins, which are excellent in insulating property and transparency. Besides, transparent photo-setting resins and inorganic materials such as polysiloxane resins may also be used for the organic insulating films 133 and 134.

In addition, the organic insulating films 133 and 134 may serve also as the alignment layer 132.

Employment of a non-contact photo-alignment method, without using a rubbing alignment treatment in which the liquid crystal alignment ability of the alignment layers 131 and 132 is imparted by direct rubbing with buff, enables to impart a uniform orientation to an entire surface of the display region without local disturbance in the vicinity of the electrodes.

Example 2

Figure 4:
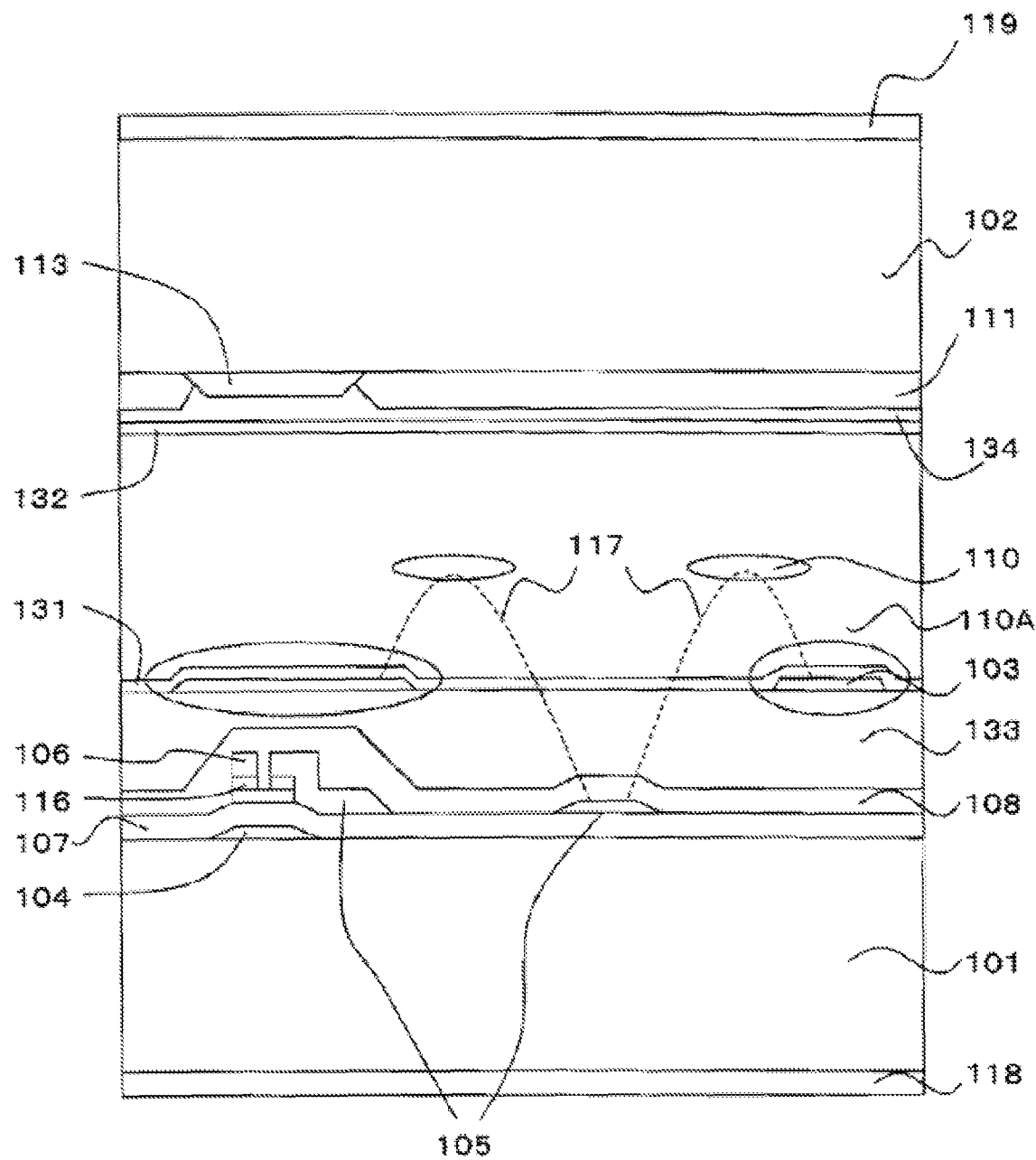
FIG. 4 is a schematic cross-sectional view illustrating a structure of a liquid crystal display device according to Example 2 of the present invention.
Figure 5A:
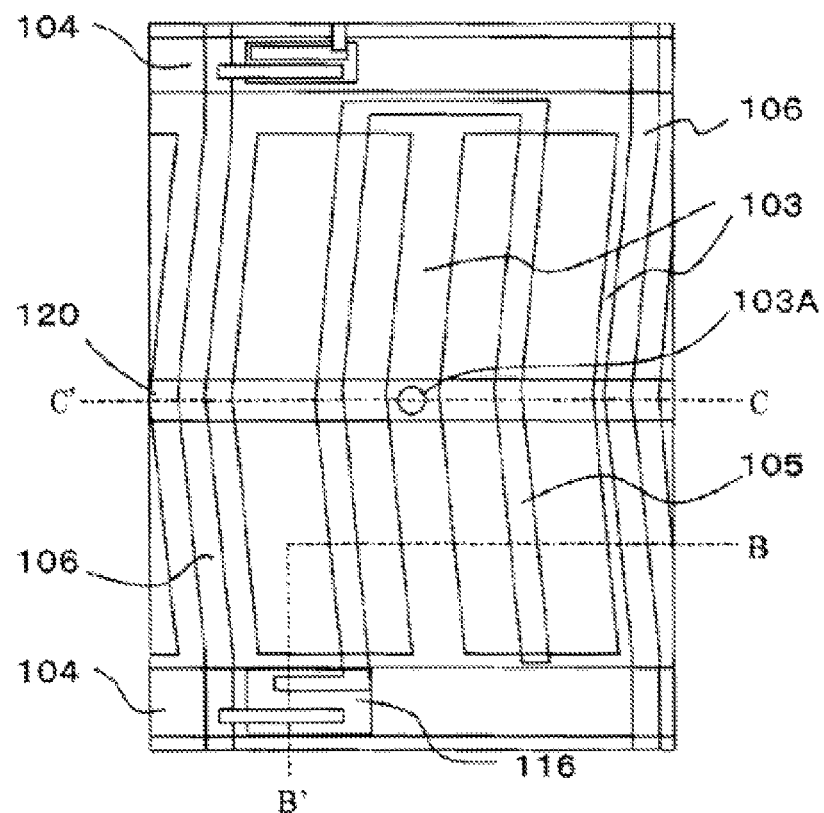
FIG. 5A is a schematic plan view of a pixel portion illustrating a pixel structure of the liquid crystal display device according to Example 2 of the present invention.
Figure 5B:
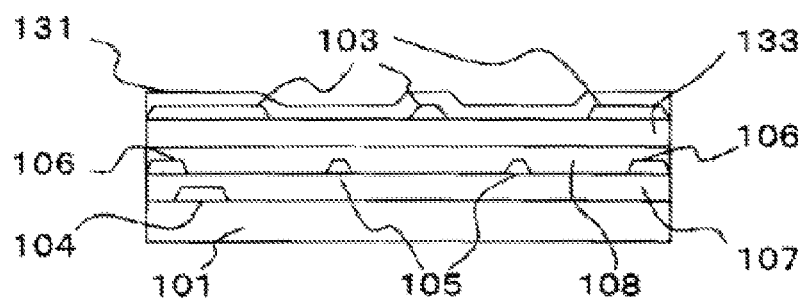
FIG. 5B is a cross-sectional view taken along the line B-B' of FIG. 5A.
Figure 5C:
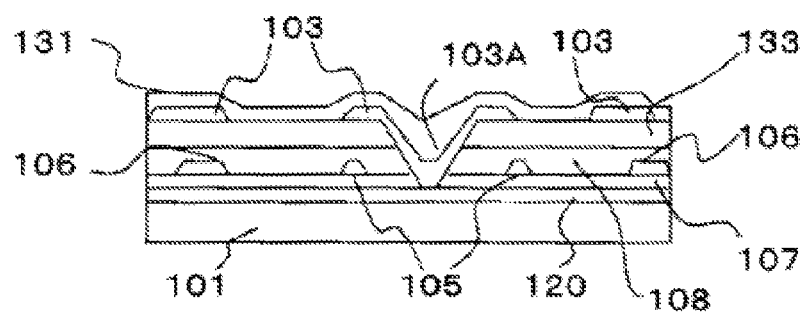
FIG. 5C is a cross-sectional view taken along the line C-C' of FIG. 5A.

Next, description is made of a liquid crystal display device according to Example 2 of the present invention. FIG. 4 is a schematic cross-sectional view of a vicinity of a pixel illustrating a liquid crystal display device according to Example 2 of the present invention. A glass substrate 101 which being an active matrix substrate and a glass substrate 102 which being a color filter substrate are imparted with a uniaxial absorption anisotropy in themselves. FIGS. 5A to 5C are schematic views of a pixel portion illustrating a pixel structure of the liquid crystal display device according to Example 2 of the present invention. FIG. 5A is a plan view, FIG. 5B is a cross-sectional view taken along the line B-B' of FIG. 5A, and FIG. 5C is a cross-sectional view taken along the line C-C' of FIG. 5A. FIG. 4 illustrates a part of a cross-section taken along the line B-B' of FIG. 5A. Note that, FIG. 5B and FIG. 5C schematically illustrate a structure of the main portion which is emphasized, and FIG. 3B and FIG. 3C do not correspond to the cut sections along the line B-B' and the line C-C', one-to-one. For example, in FIG. 3B, a semiconductor film 116 is not illustrated.

In the liquid crystal display device according to Example 2 of the present invention, a gate electrode 104 made of Cr and a common electrode wiring 120 are arranged on top of a glass substrate 101 constituting an active matrix substrate, and a gate insulating film 107 made of silicon nitride is formed so as to cover the gate electrode 104 and the common electrode wiring 120. Further, a semiconductor film 116 made of amorphous silicon or polycrystalline silicon is arranged on top of the gate electrode 104 through the gate insulating film 107 so as to function as the active layer of a thin film transistor (TFT) as an active element.

A drain electrode 106 made of chromium-molybdenum and a source electrode (pixel electrode) 105 are arranged so as to overlap with a portion of a pattern of the semiconductor film 116, and a protective film 108 made of silicon nitride is formed so as to cover all of them. An organic protective film 133 is arranged on top of the protective film 108. The organic protective film 133 is made of a transparent material such as an acrylic resin, for instance. The pixel electrode 105 is formed of a transparent electrode of ITO ($In_2O_3$:Sn) or the like. Common electrodes 103 are connected to the common electrode wiring 120 through a through-hole 103A passing through the gate insulating film 107, the protective film 108, and the organic protective film 133.

In a case where an electric field for driving liquid crystals is applied, the common electrodes 103 which form a pair with the pixel electrodes 105 are formed so as to surround a pixel region in a plane. Further, the common electrodes 103 are arranged on top of an over coat layer 133 on the organic protective film 133. Then, the common electrodes 103 are arranged so as to hide the drain electrodes 106, the scanning signal wiring 104, and the thin film transistor (TFT) as an active element, which are arranged in lower layers when viewed from above, and they also serve as a light blocking layer for blocking the semiconductor film 116 from light.

Note that, an alignment layer 131 is formed on top of a surface of the glass substrate 101 constituting the active matrix substrate having a unit pixel (one pixel) arranged thereon in matrix, namely, on top of the organic protective film 133 and the common electrodes 103 formed thereon. On the other hand, also on top of a glass substrate 102 constituting a counter substrate, a color filter layer 111 and, an alignment layer 132 and an organic protective film 134 formed thereon are formed.

Besides, as in Example 1, the alignment layers 131 and 132 are imparted with a liquid crystal alignment ability through irradiation of linear polarized ultraviolet light taken out from a high-pressure mercury lamp as a light source by using a pile polarlizer obtained by laminating quartz plates.

The glass substrate 101 and the counter substrate 102 are arranged so as to face each other with respect to planes on which the alignment layers 131 and 132 are formed respectively, and a liquid crystal composition layer 110A formed of liquid crystal molecules 110 is arranged between the glass substrate 101 and the counter substrate 102. Polarizing plates 118 and 119 are formed on outer surfaces of the glass substrate 101 and the counter electrode 102, respectively.

In Example 2 of the present invention, as in Example 1 of the invention, the pixel electrodes 105 are arranged under the organic insulating layer 133 and the protective film 108, and the common electrodes 103 are arranged over the pixel electrodes 105 and the organic protective film 133. Further, if an electric resistance of the common electrodes 103 is sufficiently low, the common electrodes 103 may also serve as the common electrode wiring 120 arranged as the lowest layer. In this case, the formation of the common electrode wiring 120 arranged as the lowest layer and the fabrication of the through-hole accompanying therewith may be omitted.

In Example 2, as illustrated in FIG. 5A, each pixel is formed in a region surrounded by the common electrodes 103 formed in a lattice form and is arranged so as to be divided into four regions, inclusive of the pixel electrode 105. Each pixel has a zigzag bent structure in which the pixel electrode 105 and the common electrodes 103 facing the pixel electrode 105 are arranged in parallel with each other. Each pixel forms two or more sub-pixels. With this structure, a structure is formed in which a color tone change in a plane is compensated for. In this example, there is employed a structure in which the glass substrate 101 and the glass substrate 102 in themselves are imparted with the uniaxial absorption anisotropy. However, the uniaxial absorption anisotropy may be imparted to only one of those substrates.

Example 3

Figure 6:
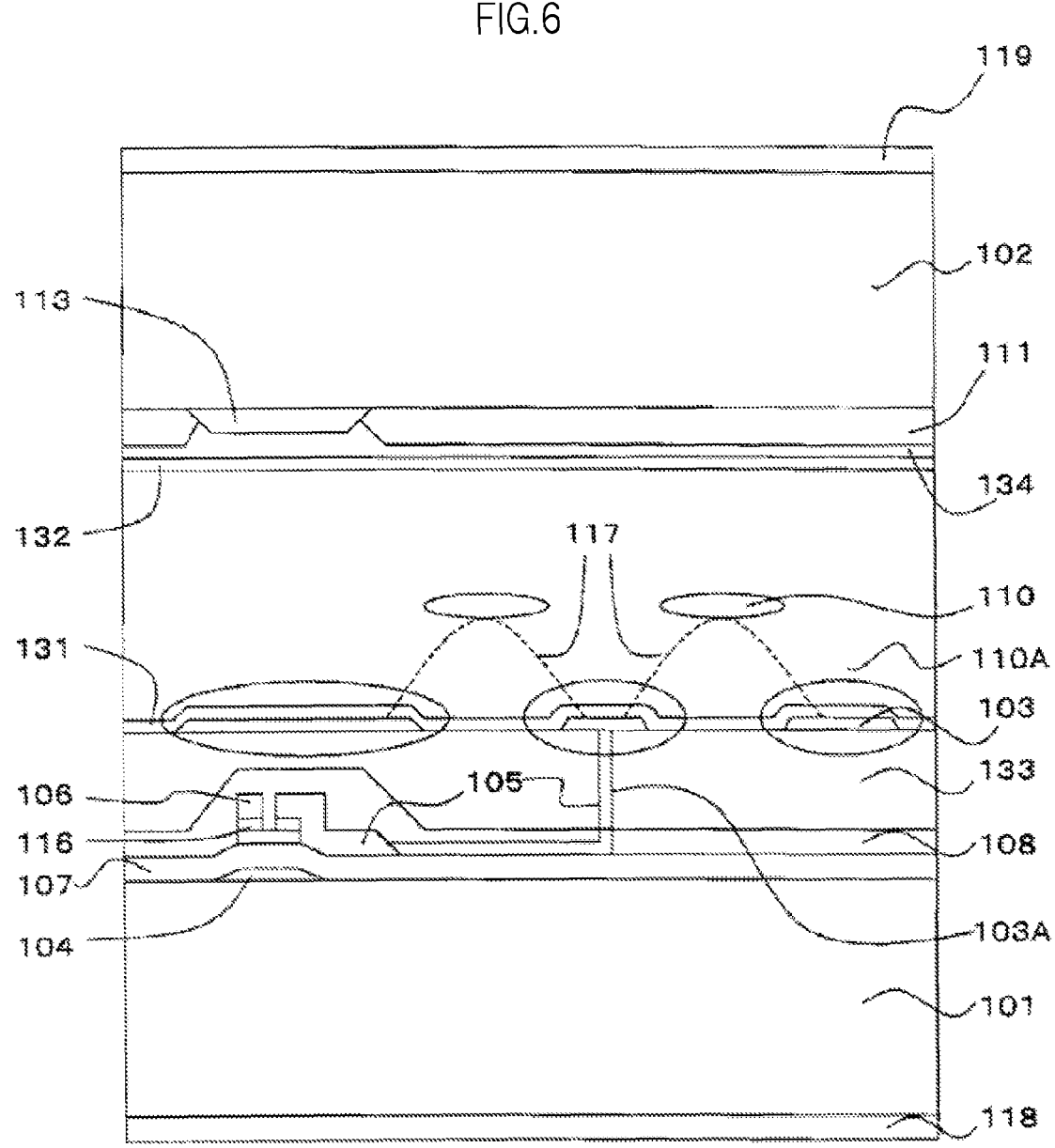
FIG. 6 is a schematic cross-sectional view illustrating a structure of a liquid crystal display device according to Example 3 of the present invention.

FIG. 6 is a schematic cross-sectional view of a vicinity of a pixel, which illustrates a liquid crystal display device according to Example 3 of the present invention. In FIG. 6, the same symbols as in the drawings in the respective examples described above correspond to the same functional portions as in those examples. As illustrated in FIG. 6, in this example, a pixel electrode 105 arranged under a protective film 108 is drawn up to a surface of an organic protective film 133 through a through-hole 103A to be arranged at the same layer as that of common electrodes 103. If this structure is taken, a voltage for driving liquid crystals may be further reduced. In this example, the active matrix substrate 101 and the color filter substrate 102 may be a glass substrate or a resin film substrate, and are in themselves provided with the uniaxial absorption anisotropy. However, the uniaxial absorption anisotropy may be imparted to only one of those substrates.

Example 4

Figure 7:
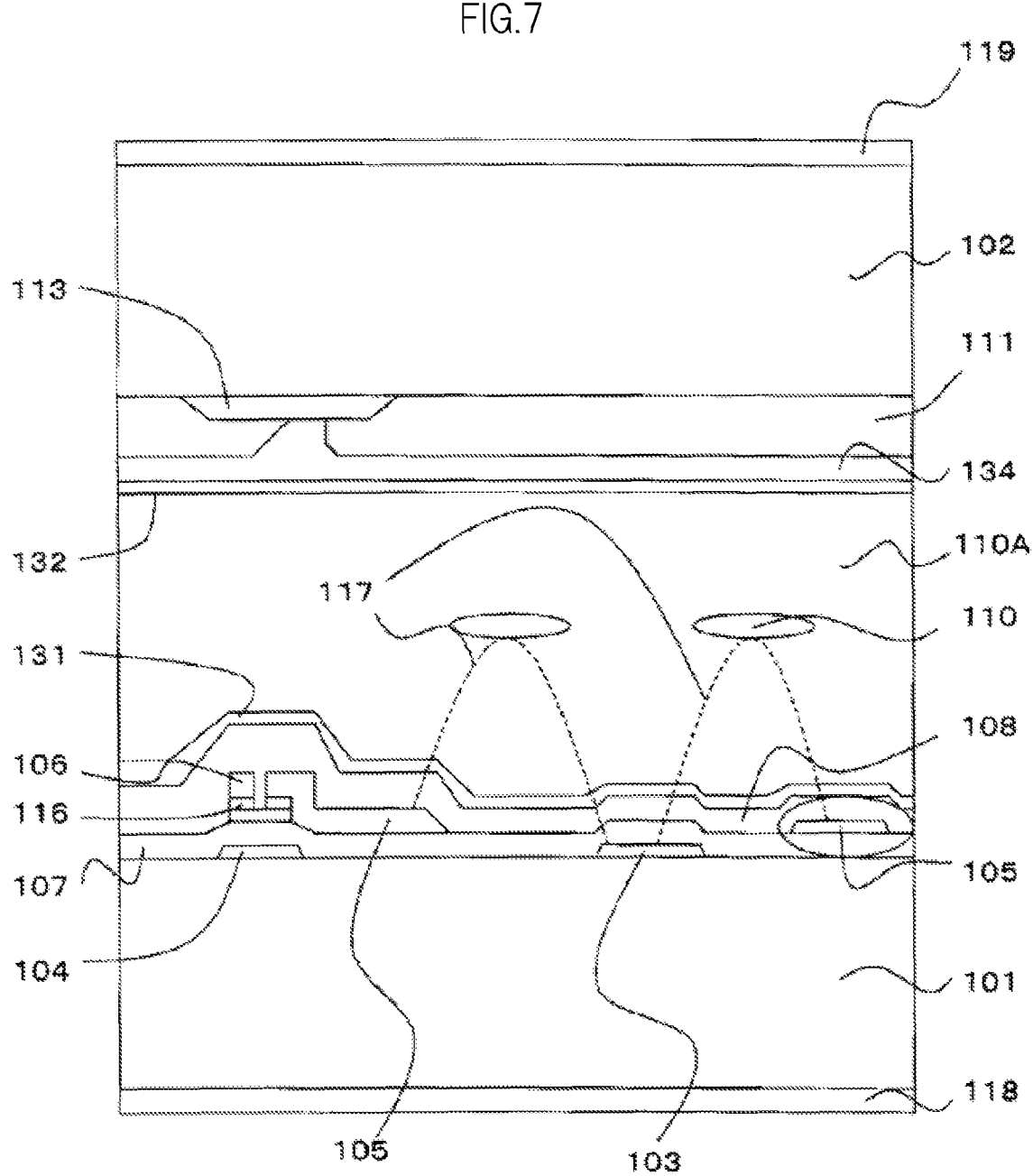
FIG. 7 is a schematic cross-sectional view illustrating a structure of a liquid crystal display device according to Example 4 of the present invention.

FIG. 7 is a schematic cross-sectional view of a vicinity of a pixel, which illustrates a liquid crystal display device according to Example 4 of the present invention. In FIG. 7, the same symbols as in the drawings in the respective examples described above correspond to the same functional portions as in those examples. In this example, there is employed a structure having a large step due to electrodes, or the like. In this example, the active matrix substrate 101 and the color filter substrate 102 may be a glass substrate or a resin film substrate, and are in themselves provided with the uniaxial absorption anisotropy. However, the uniaxial absorption anisotropy may be imparted to only one of those substrates.

Example 5

Figure 8:
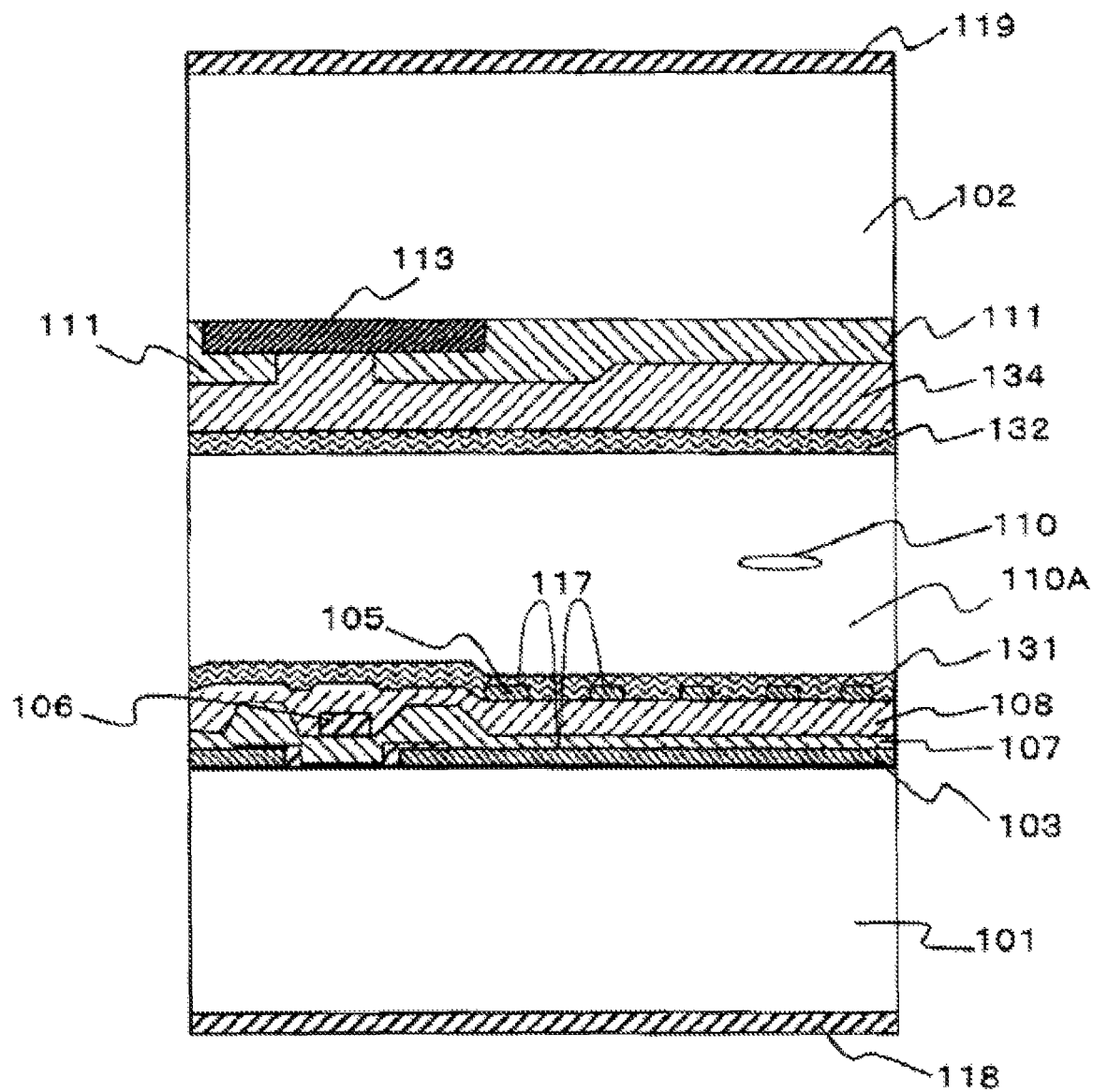
FIG. 8 is a schematic cross-sectional view illustrating a structure of a liquid crystal display device according to Example 12 of the present invention.

FIG. 8 is a schematic cross-sectional view of a vicinity of a pixel which illustrates a liquid crystal display device according to Example 5 of the present invention. In FIG. 8, the same symbols as in the drawings in the respective examples described above correspond to the same functional portions as in those examples. In this example, pixel electrodes 105 and common electrodes 103 are formed of ITO, and the common electrode 107 is formed of a solid electrode covering substantially an entire of a pixel. With this structure, the portion over the electrodes may be utilized as a transmission portion, thereby being capable of improving an aperture ratio. Further, a distance between the electrodes may be reduced, thereby being capable of effectively applying an electric field to liquid crystals. In this example, the active matrix substrate 101 and the color filter substrate 102 may be a glass substrate or a resin film substrate, and are in themselves provided with the uniaxial absorption anisotropy. However, the uniaxial absorption anisotropy may be imparted to only one of those substrates.

In the liquid crystal display device of TFT type constructed as described above, when no electric field is applied, liquid crystal molecules 110 constituting a liquid crystal layer (liquid crystal composition layer) 110A become substantially parallel to the surfaces of glass substrates 101 and 102 arranged so as to face each other, and are homogeneously oriented in an initial orientation direction defined by a photo-alignment treatment. In this case, when a voltage is applied to a gate electrode 104 to turn on a thin film transistor (TFT), an electric field 117 is applied to the liquid crystal composition layer 110A owing to an electric potential difference between the pixel electrodes 105 and the common electrodes 103, and the liquid crystal molecules 110 turn into the direction of the electric field due to an interaction between the dielectric anisotropy of the liquid crystal composition and the electric field. At this time, the light transmittance of the liquid crystal display device is varied by a refraction anisotropy of the liquid crystal composition layer 110A and an action of polarizing plates 118 and 119, whereby display can be carried out. In this example, the active matrix substrate 101 and the color filter substrate 102 may be a glass substrate or a resin film substrate, and are in themselves provided with the uniaxial absorption anisotropy. However, the uniaxial absorption anisotropy may be imparted to only one of those substrates.

In the above-mentioned respective examples relating to the liquid crystal display device of the present invention, multiple groups of the display regions formed of a common electrode and a pixel electrode in each pixel may be provided. With the provision of the multiple groups, the distance between the pixel electrode and the common electrode may be reduced, thereby being capable of lowering an applying voltage for driving the liquid crystals.

In the above-mentioned respective examples relating to the liquid crystal display device of the present invention, a material for a transparent electroconductive film constituting at least one of the pixel electrode and the common electrode is not particularly limited. However, it is preferred to use a transparent electroconductive film formed by doping ion to titanium oxide such as indium-tin-oxide (ITO) or an ion-doped zinc oxide, in view of ease of processing, high reliability, and the like.

It is generally known that, in an in-plane switching (IPS) system called a lateral electric field system, a boundary-surface tilt with respect to a surface of a substrate is unnecessary in principle unlike in a longitudinal electric field system represented by a conventional TN system, and visual angle characteristics may be improved as a boundary-surface tilt angle is as small as possible. Also in a photo-alignment layer, a small boundary-surface tilt angle is preferred, and a boundary-surface tilt angle of 1 degree or less is particularly effective.

Next, formation of an alignment layer using a rubbingless alignment method for a liquid crystal alignment layer is described below as a step of fabricating the liquid crystal display device of the present invention. A flow of formation steps of the alignment layer according to the present invention is as follows: that is, (1) formation of a coating film for alignment layer (uniform coating film is formed on an entire surface of a display region);

(2) calcination to imidize the alignment layer (removal of a varnish solvent and to promote a conversion to a highly heat-resistant polyimide);

(3) impartment of liquid crystal alignment ability through irradiation of polarized light (uniform alignment ability is imparted to the display region); and (4) promotion and stabilization of the alignment ability by (heating, infrared ray irradiation, far infrared ray irradiation, electron ray irradiation, or radiation irradiation).

The alignment layer is formed through a process including the above-mentioned four steps of (1) to (4). The order of the steps is not limited to the order of (1) to (4) in the process. A larger effect may be expected in the following cases. (a) The above-mentioned steps (3) and (4) are carried out so as to overlap with each other in terms of time, to thereby accelerate the impartment of the liquid crystal alignment ability to induce crosslinking reaction or the like, with the result that the alignment layer may be formed more effectively. Further, (b) when the heating, the infrared ray irradiation, the far infrared ray irradiation, or the like in the above-mentioned step (4) is employed, the above-mentioned step (4) becomes able to serve also as the step (2) of imidization when the above-mentioned steps (2), (3) and (4) are allowed to overlap in terms of time, thereby being capable of forming the alignment layer in a short period of time.

Next, description is made of specific examples relating to a manufacturing method of the liquid crystal display device of the present invention. Examples relating to the manufacturing method of the above-mentioned liquid crystal display device are described in Example 6 to Example 13 of the present invention. Note that, hereinbelow, in order to make understanding of the examples easier, comparative examples are also described as needed.

Example 6

Example 6 relating to a method of manufacturing a liquid crystal display device corresponds to the liquid crystal display device described in the liquid crystal display device according to Example 1. Hereinafter, description is made of Example 6 relating to a manufacturing method for a liquid crystal display device of the present invention with reference to a structure illustrated in FIG. 2 and FIGS. 3A to 3C.

In the liquid crystal display device described in Example 1 of the present invention, a glass substrate having a thickness of 0.7 mm and a surface thereof is polished is used as a substrate 101 constituting the active matrix substrate (TFT substrate). As a base 102 for constituting the counter substrate (color filter substrate: CF substrate), a polyimide film is formed into a resin film base. C.I. Direct Yellow 12 is added thereto by 30% by weight with respect to resin components and is sufficiently dispersed to obtain a resin film base having a thickness of about 0.5 mm. The resulting resin film base is used as the base 102. The absorbance of the resin film base was measured. As a result, an absorbance peak was 408, and the absorbance was 0.74.

Here, in order to impart the uniaxial absorption anisotropy to the polyimide resin film base 102, constituting the color filter substrate, the polyimide resin film base 102 was subjected to stretching processing before formation of the color filter layer 111. In this stage, stretching conditions were varied in series to prepare five substrates having different dichroic ratios. Results of measuring the dichroic ratios of those color filter substrates were shown in Table 1.

TABLE 1

| | Dichroic ratios of substrates | | | | |
| --- | --- | --- | --- | --- | --- |
| | Specification | | | | |
| | 1 | 2 | 3 | 4 | 5 |
| dichroic ratio | 1.52 | 1.85 | 2.15 | 3.42 | 5.83 |

A light blocking portion 113 having a film thickness of 1.0 μm was formed on the color filter substrate using a black resist. Next, the color filter layer 111 formed of a pixel, which was partitioned by the light blocking portion 113 and arranged, was formed using a dye resist. In this example, thicknesses of blue, green, and red colors were set to 3.0 μm, 2.7 μm, and 2.5 μm, respectively, but the film thickness may arbitrary be set in accordance with a desired color purity, or the thickness of the liquid crystal layer. On top of the color filter layer 111, an over coat film 134 having a film thickness of 1.0 μm and made of an acrylic resin, for leveling the steps of the respective pixels was formed. Next, on the surface of the color filter substrate, polyamic acid varnish was formed as the alignment layer by printing, and heat-treated at 220° C. for 30 minutes to form an alignment layer 132 formed of a dense polyimide film of about 80 nm. The alignment ability was imparted to the alignment layer by the rubbing treatment. As a result, the color filter substrate having a light absorbing axis in a direction parallel to the stretching direction of the polyimide film base and a light transmitting axis in a perpendicular direction to the stretching direction was obtained.

A thin film transistor 115 formed on the glass substrate 101 constituting the active matrix substrate includes a pixel electrode 105, a signal electrode 106, a scanning electrode 104, and an amorphous silicon 116. The scanning electrode 104, the common electrode wiring 120, the signal electrode 106, and the pixel electrode 105 are all formed by patterning a chromium film, and a distance between the pixel electrode 105 and the common electrodes 103 was set to 7 μm. Note that, the chromium film, which had low resistance and was easy for patterning, was used for the common electrodes 103 and the pixel electrode 105. However, an ITO film may be used to form a transparent electrode, thereby being capable of attaining higher brightness characteristics. The gate insulating film 107 and the protective insulating film 108 were made of silicon nitride, and film thicknesses thereof were set to 0.3 μm, respectively. On top thereof, the acrylic resin was applied and followed by heat treatment at 220° C. for one hour, thereby forming an insulating organic film 133 having a transparency and insulating property into a film thickness of 1.5 μm.

Next, as illustrated in FIG. 3C, a through hole was formed until the common electrode wiring 120 through photolithography and etching processing, and the common electrodes 103 connecting to the common electrode wiring 120 were formed by patterning. As a result, as illustrated in FIG. 3A, the pixel electrode 105 was arranged among the three common electrodes 103 within a unit pixel (one pixel), and the active matrix substrate with the number of pixels of 1024×3×768, constructed of 1024×3 (corresponding to R, G, and B) of the signal electrodes 106 and 768 of the scanning electrodes 104 was formed. The number of pixels is constructed of 1024×3 (corresponding to R, G, and B) of the signal electrodes 106 and 768 of the scanning electrodes 104. Next, on the surface of the active matrix substrate, polyamic acid varnish was formed as the alignment layer by printing, and heat-treated at 220° C. for 30 minutes to form the alignment layer 131 formed of a dense polyimide film of about 80 nm. The alignment ability was imparted to the alignment layer by the rubbing treatment.

Next, the glass substrate 101 constituting the active matrix substrate which being a base and the resin film 102 constituting the color filter substrate were arranged so that the surfaces having the alignment layers 131 and 132, respectively, each having a liquid crystal alignment ability, face with each other. A spacer formed of dispersed spherical polymer beads was placed between those surfaces, and a sealing agent was applied to a periphery, to thereby fabricate a liquid crystal display panel (referred to also as cell) to be made into a liquid crystal display device. The liquid crystal alignment directions of the two substrates were substantially parallel to each other, and an angle between those directions and a direction of an applied electric field was adjusted to 75 degrees. A nematic liquid crystal composition A having a positive dielectric anisotropy $\Delta\in$ of 10.2 (1 kHz, 20° C.), a refractive index anisotropy Δn of 0.075 (wavelength 590 nm, 20° C.), a torsional modulus K2 of 7.0 pN, and a nematic-isotropic phase transition temperature T(N-I) of about 76° C. was injected into the cell under vacuum, and the cell was sealed with a sealing agent made of a ultraviolet-setting resin. Thus, a liquid crystal panel having a thickness of liquid crystal layer (gap) of 4.2 μm was prepared.

The retardation (And) of this liquid crystal display panel is about 0.31 μm. This liquid crystal display panel was sandwiched by two polarizing plates 118 and 119, and the axis of polarized light transmission of one of the polarizing plates was made substantially parallel to the above-mentioned liquid crystal alignment direction and that of the other polarizing plate was made perpendicular thereto. In that case, the absorption axis of the polarizing plate 119 arranged on the color filter substrate on the viewer side was arranged substantially parallel to the direction of the absorption axis of the resin film 102 constituting the color filter substrate.

After that, a driving circuit, a backlight, and the like were connected to obtain a module, and five active matrix liquid crystal display devices were obtained. In this example, normally close characteristics were attained, in which a dark display was obtained at a low voltage and a light display was obtained at a high voltage.

Next, display qualities (contrast ratio (CR) and chromaticity coordinate variation Δu'v') of the above-mentioned five liquid crystal display devices according to the example of the present invention were evaluated, and the following results shown in Table 2 were obtained.

TABLE 2

| | specification | | | | |
|---|---|---|---|---|---|
| | 1 | 2 | 3 | 4 | 5 |
| CR | 425 | 427 | 513 | 568 | 598 |
| Δu'V' | 0.058 | 0.057 | 0.038 | 0.030 | 0.027 |

CR and Δu'V' in the liquid crystal display device of Example 1

Comparative Example 1

In Comparative Example 1, the liquid crystal display device was fabricated in the same manner as in Example 6 except that Direct Yellow was not added to a resin film constituting the color filter substrate in Example 6. The display quality in Comparative Example 1 was verified, and found that the contrast ratio was 430, and chrominance Δu'v' was 0.061.

Example 7

Detailed description is made of Example 7 relating to a method of manufacturing a liquid crystal display device of the present invention with reference to a structure illustrated in FIG. 2 and FIGS. 3A to 3C. Difference between Example 6 resides in that the color filter substrate 102 is formed of the glass substrate as the active matrix substrate 101.

In Example 7 of the present invention relating to the manufacturing method of the present invention, a glass substrate having a thickness of 0.7 mm and a surface thereof is polished is used as the active matrix substrate 101 and the counter substrate (color filter substrate) 102. The light blocking portion 113 having a film thickness of 1.0 μm was formed on top of the glass substrate 102 constituting the color filter substrate using a black resist. Next, the color filter layer 111 formed of a pixel, which was partitioned by the light blocking portion 113 and arranged, was formed using a dye resist. In this example, thicknesses of blue, green, and red colors were set to 3.0 μm, 2.7 μm, and 2.5 μm, respectively, but the film thickness may arbitrary be set in accordance with a desired color purity, or the thickness of the liquid crystal layer. On top of the color filter layer 111, an over coat film 134 having a film thickness of 1.0 μm and made of an acrylic resin, for leveling the steps of the respective pixels was formed.

Next, C.I. Direct Yellow 12 was added to a polyamic acid varnish formed of a 1:1 (by mole) mixture of p-phenylenediamine as diamine compound and 1,4-diaminopyridine and 1,2,3,4-cyclobutanetetracarboxylic dianhydride as acid dianhydride, and the resulting mixture was adjusted so as to have a resin concentration of 5% by weight, a C.I. Direct Yellow 12 concentration of 3% by weight, an NMP concentration of 60% by weight, a γ-butyllactone concentration of 20% by weight, and a butyl Cellosolve concentration of 12% by weight. This mixture was formed by printing and heat-treated at 220° C. for 30 minutes to form an alignment layer 132 formed of a dense polyimide film of about 80 nm on the surface of the glass substrate 102 which being a color filter substrate.

In order to impart the liquid crystal alignment ability and the absorption anisotropy to the surface of the alignment layer 132, polarized UV (ultraviolet rays) light was applied to the polyimide alignment layer 132. As a light source, a high-pressure mercury lamp was used. The ultraviolet light within a range of 240 nm to 600 nm was taken out from the light source through an interference filter, and was polarized into a linearly polarized light having a polarizing ratio of about 10:1 with the use of a pile polarizer obtained by laminating quartz plates. The irradiation was performed substantially perpendicularly to the substrate with irradiation energy of about 5 J/cm$^2$.

As a result, there was obtained a color filter substrate in which the orientation directions of the liquid crystal molecules on the surface of the alignment layer is perpendicular to a polarizing direction of the irradiated polarized UV, has a light absorbing axis in a perpendicular direction to the polarizing direction of the irradiated polarized UV, and has a light transmitting axis in a parallel direction to the polarizing direction of the irradiated polarizing light. The polarized UV spectrum of the color filter substrate was measured, and found that the difference of the absorbances between the transmission axis and the absorption axis was 0.21.

A thin film transistor 115 formed on the glass substrate 101 constituting the active matrix substrate includes a pixel electrode 105, a signal electrode 106, a scanning electrode 104, and an amorphous silicon 116. The scanning electrode 104, the common electrode wiring 120, the signal electrode 106, and the pixel electrode 105 are all formed by patterning a chromium film, and a distance between the pixel electrode 105 and the common electrodes 103 is set to 7 μm. Note that, the chromium film, which has low resistance and is easy for patterning, is used for the common electrodes 103 and the pixel electrode 105. However, an ITO film may be used to form a transparent electrode, thereby being capable of attaining higher brightness characteristics. The gate insulating film 107 and the protective insulating film 108 are made of silicon nitride, and film thicknesses thereof are set to 0.3 μm, respectively. On top thereof, the acrylic resin is applied and followed by heat treatment at 220° C. for one hour, thereby forming an insulating organic film 133 having a transparency and insulating property into a film thickness of 1.5 μm.

Next, as illustrated in FIG. 3C, a through hole was formed until the common electrode wiring 120 through photolithography and etching processing, and the common electrodes 103 connecting to the common electrode wiring 120 were formed by patterning.

As a result, as illustrated in FIG. 3A, the pixel electrode 105 was arranged among the three common electrodes 103 within a unit pixel (one pixel), and the active matrix substrate with the number of pixels of 1024×3×768, constructed of 1024×3 (corresponding to R, G, and B) of the signal electrodes 106 and 768 of the scanning electrodes 104 was formed.

Next, a polyamic acid varnish formed of a 1:1 (by mole) mixture of p-phenylenediamine as diamine compound and 1,4-diaminopyridine, and 1,2,3,4-cyclobutanetetracarboxylic dianhydride as acid dianhydride was adjusted so as to have a resin concentration of 5% by weight, an NMP concentration of 60% by weight, a γ-butyllactone concentration of 20% by weight and a butyl Cellosolve concentration of 15% by weight. This mixture was formed by printing as the alignment film on the above-mentioned active matrix substrate, and subjected to imidization by heat treatment at 220° C. for 30 minutes. Thus, a dense polyimide alignment layer 131 of about 80 nm was formed.

Next, the two glass substrates 101 and 102 were arranged so that the surfaces having the alignment layers 131 and 132, respectively, each having a liquid crystal alignment ability, face with each other. A spacer formed of dispersed spherical polymer beads was placed between those surfaces, and a sealing agent was applied to a periphery, to thereby fabricate a liquid crystal display panel (referred to also as cell) to be made into a liquid crystal display device. The liquid crystal alignment directions of the two substrates were substantially parallel to each other, and an angle between those directions and a direction of an applied electric field was adjusted to 75 degrees. A nematic liquid crystal composition A having a positive dielectric anisotropy $\Delta\varepsilon$ of 10.2 (1 kHz, 20° C.), a refractive index anisotropy $\Delta$n of 0.075 (wavelength 590 nm, 20° C.), a torsional modulus K2 of 7.0 pN, and a nematic-isotropic phase transition temperature T(N-I) of about 76° C. was injected into the cell under vacuum, and the cell was sealed with a sealing agent made of a ultraviolet-setting resin. Thus, a liquid crystal panel having a thickness of liquid crystal layer (gap) of 4.2 μm was prepared.

The retardation ($\Delta$nd) of this liquid crystal display panel is about 0.31 μm. This liquid crystal display panel was sandwiched by two polarizing plates 118 and 119, and the axis of polarized light transmission of one of the polarizing plates was made substantially parallel to the above-mentioned liquid crystal alignment direction and that of the other polarizing plate was made perpendicular thereto. In that case, the absorption axis of the polarizing plate 119 arranged on the color filter substrate on the viewer side was arranged substantially parallel to the direction of the absorption axis of the resin film 102 formed on the color filter substrate. After that, a driving circuit, a backlight, and the like were connected to obtain a module, and the active matrix liquid crystal display device was obtained. In this example, normally close characteristics were attained, in which a dark display was obtained at a low voltage and a light display was obtained at a high voltage.

Next, the display quality of the liquid crystal display device manufactured by the manufacturing method according to Example 7 of the present invention was evaluated, and a high-quality display having a contrast ratio of 630:1 was confirmed. Further, the chromaticity coordinate variation between white display and black display was measured, and chrominance $\Delta$u'v' was 0.029.

Comparative Example 2

In Comparative Example 2, the liquid crystal display device was fabricated in the same manner as the liquid crystal display device as illustrated in FIG. 4 in Example 2 except that C.I. Direct Yellow 12 was not added to the alignment layer 132 in Example 7. The polarized UV spectrum of the color filter substrate obtained at this time was measured, and the anisotropy of the absorption was hardly observed. The display quality of the liquid crystal display device in Comparative Example 2 was evaluated, and found that the contrast ratio was 480:1, and chrominance $\Delta$u'v' between the white display and the black display was 0.052.

Example 8

In Example 8 of the present invention relating to a manufacturing method for a liquid crystal display device, the liquid crystal display device is fabricated in the same manner as in Example 7 except that pigment is not added to the alignment layer 132 of Example 7 of the liquid crystal display device, and resin compositions and its treatment method of the protective films 161 and 162 of the polarizing plate 118 were changed. A polyvinyl alcohol film onto which iodine having a film thickness of 1 μm is adsorbed is stretched to form a polarizer 163. Brilliant Yellow as a pigment is added and dispersed to triacetyl cellulose as a resin so as to have a resin concentration of 50% by weight, and this was used as the protective films 161 and 162 for the polarizer 163.

In order to impart the absorption anisotropy to the protective films 161 and 162 of the polarizing plate to which the pigment was added, the polarized UV (ultraviolet rays) light was applied to the protective films 161 and 162 in a perpendicular direction. As a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarizer obtained by laminating quartz plates. The irradiation was performed with irradiation energy of about 5 J/cm². The polarizing plate protective films 161 and 162 are bonded so that the absorption axes of the polarizing plate protective films 161 and 162 are substantially parallel to the absorption axis of the polarizer 163. The display quality of the liquid crystal display device fabricated in Example 8 is evaluated, and found that the contrast ratio was 720:1, and chrominance Δu'v' between the white display and the black display was 0.037.

Example 9

In Example 9 of the present invention relating to a manufacturing method for a liquid crystal display device, pigment is not added to the alignment layer 132 of Example 2 of the liquid crystal display device, and Brilliant Yellow was added to a resin concentration of 30% by weight, C.I. Direct Red 81 was added to a resin concentration of 10% by weight, and C.I. Direct Blue was added to a resin concentration of 10% by weight and dispersed to the acrylic resin of an adhesive layer formed so as to bond the polarizing plate 119 onto the substrate 102, and this was used.

After bonding the polarizing plate 119 to the substrate 102 through the adhesive layer, in order to impart the absorption anisotropy to the adhesive layer, polarized UV (ultraviolet rays) light was applied to the adhesive layer from the polarizing plate side so as to conform with the transmission axis of the polarizer 167. As a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarizer obtained by laminating quartz plates. The irradiation was performed substantially perpendicularly to the substrate with irradiation energy of about 10 J/cm².

With the adhesive layer of the polarizing plate, the polarizing plate is bonded on the quartz substrate, and the polarized UV spectrum thereof was measured. As a result, it was found that the polarizing plate has an absorption anisotropy having an absorption axis in a perpendicular direction with respect to irradiated polarized UV light. The display quality of the liquid crystal display device fabricated in Example 9 was measured, and found that the contrast ratio was 680:1, and chrominance Δu'v' between the white display and the black display was 0.039.

Example 10

In Example 10 of the present invention relating to a manufacturing method for a liquid crystal display device, the liquid crystal display device is fabricated in the same manner as in Example 7 except that compositions of the resist material of the color filter layer 111 formed on the color filter substrate side of Example 7 and its treatment method were changed. Further, C.I. Direct Yellow 44 was add to a resist material for displaying a blue color in the color filter to a concentration of 5% by weight, C.I. Direct Red 81 was added to a resist material constituting a green color to a concentration of 3% by weight, and C.I. Direct Blue 151 was added to a resist material constituting a red color to a concentration of 3% by weight, respectively, and dispersed to the resist material, and this was used.

After the formation of the color filter layer 111 through the color resist to which pigment was added, in order to impart the absorption anisotropy to the color resist portion before the formation of the over coat film 134, polarized UV (ultraviolet rays) light was applied to the color filter layer 111. As a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarizer obtained by laminating quartz plates. The irradiation was performed substantially perpendicularly to the substrate with irradiation energy of about 8 J/cm². In addition, on top of the obtained color filter substrate, the over coat film 134 and the alignment layer 132 were formed. At this time, the polarization axis of the polarizing light which is applied to the alignment layer 132 is set to be substantially parallel with the polarization axis of the polarizing light which was applied to the color filter layer 111.

As a result, the color filter substrate having the absorption axis in an orthogonal direction to the polarization direction of the irradiated polarized UV was obtained. The polarized UV spectrum of the color filter substrate was measured, and found that the difference of the absorbances between the transmission axis and the absorption axis was 0.31. The display quality of the liquid crystal display device fabricated in Example 10 was measured, and found that the contrast ratio was 730:1, and chrominance Δu'v' between the white display and the black display was 0.023.

Example 11

In Example 11 of the present invention relating to a manufacturing method for a liquid crystal display device, the liquid crystal display device is fabricated in the same manner as in Example 10 except that the acrylic resin composition of the over coat film 134 formed on the color filter substrate side of Example 10, and its treatment method were changed. The C.I. Direct Yellow 12 was added and dispersed to the acrylic resin of the above-mentioned over coat film 134 to a concentration of 30% by weight, and this was used.

After the formation of the pigment added over coat film 134 on top of the color filter layer 111, in order to impart the absorption anisotropy to the surface of the over coat film 134 before the formation of the alignment film 132, polarized UV (ultraviolet rays) light was applied to the over coat film 134. As a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarizer obtained by laminating quartz plates. The irradiation was performed substantially perpendicularly to the substrate with irradiation energy of about 12 J/cm². In addition, on top of the obtained color filter substrate, the alignment layer 132 was formed as in Example 2. At this time, the polarization axis of the polarizing light which is applied to the alignment layer 132 is set to be substantially parallel with the polarization axis of the polarizing light which was applied to the over coat film 134.

As a result, the color filter substrate having the absorption axis in an orthogonal direction to the polarization direction of the irradiated polarized UV was obtained. The polarized UV spectrum of the color filter substrate was measured, and found that the difference of the absorbances between the transmission axis and the absorption axis was 0.37. The display quality of the liquid crystal display device fabricated in Example 11 was measured, and found that the contrast ratio was 780:1, and chrominance $\Delta u'v'$ between the white display and the black display was 0.018.

Example 12

Description is made of Example 12 of the present invention relating to a manufacturing method of the liquid crystal display device with reference to FIG. 8. In the manufacturing method for a liquid crystal display device according to Example 12 of the present invention, the glass substrate having a thickness of 0.7 mm, and a surface thereof is polished is used as the substrate 101. On top of the substrate 101, the insulating film 107 for preventing short-circuits of the electrodes 103, 104, 105, and 106 from occurring, the thin film transistor 115, and the organic insulating protective film 108 for protecting the thin film transistor 115 and the electrodes 105 and 106, to which Brilliant Yellow was added and dispersed to a resin concentration of 10% by weight, are formed to obtain a TFT substrate.

The thin film transistor 115 includes a pixel electrode 105, a signal electrode 106, a scanning electrode 104, and an amorphous silicon 116. The scanning electrode 104 is formed by patterning an aluminum film, the signal electrode 106 is formed by patterning a chromium film, and the common electrodes 103 and the pixel electrode 105 are formed by patterning ITO. The film thicknesses of the insulating film 107 and the organic insulating protective film 108 are set to 0.2 μm and 0.3 μm, respectively. A capacitor element is formed so as to have a structure in which the insulating films 107 and 108 are sandwiched by the pixel electrodes 105 and the common electrode 103. The pixel electrode 105 is arranged at an upper layer so as to overlap with the solid common electrode 103. The number of pixels is 1024×3×768, with 1024×3 (corresponding to R, G, and B) of the signal electrodes 106 and 768 of the scanning electrodes 104.

In order to impart the absorption anisotropy to the surface of the organic insulating protective film 108 before the formation of the alignment film 131, polarized UV (ultraviolet rays) light was applied to the organic insulating protective film 108. As a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarizer obtained by laminating quartz plates. The irradiation was performed substantially perpendicularly to the substrate with irradiation energy of about 4 J/cm². At this time, the polarization axis of the polarizing light which is applied to the alignment layer 131 is set to be substantially parallel with the polarization axis of the polarizing light which was applied to the organic insulating protective film 108. As a result, the TFT having the absorption axis in an orthogonal direction to the polarization direction of the irradiated polarized UV was obtained. The polarized UV spectrum of the TFT was measured, and found that the dichroic ratio was 3.52.

Next, a polyamic acid varnish formed of a 3:1 (by mole) mixture of p-phenylenediamine as diamine compound and 3,4-diaminothiophene, and a 1:1 (by mole) mixture of 1,2,3,4-cyclobutanetetracarboxylic dianhydride as acid dianhydride and pyromellitic dianhydride was adjusted so as to have a resin concentration of 5% by weight, an NMP concentration of 60% by weight, a γ-butyllactone concentration of 20% by weight and a butyl Cellosolve concentration of 15% by weight, and it was formed by printing on the above-mentioned active matrix substrate and subjected to imidization by heat treatment at 220° C. for 30 minutes. Thus, a dense polyimide alignment layer 131 of about 110 nm was formed.

Next, on the surface of the other active matrix substrate on which ITO was formed, the same polyamic acid varnish was formed by printing, and heat-treated at 220° C. for 30 minutes to form the alignment layer 132 formed of a dense polyimide film of about 110 nm.

The alignment directions of the alignment layers 131 and 132 on the TFT substrate and the color filter substrate were made substantially parallel to each other, and the angle formed with the direction of an applied electric field 117 was adjusted to 15 degrees. Polymer beads having an average particle size of 4 μm were dispersed as a spacer between those substrates, and liquid crystals 110 were sandwiched between the TFT substrate and the color filter substrate. As the liquid crystals 110, a nematic liquid crystal composition having a positive dielectric anisotropy $\Delta \in$ of 10.2 (1 kHz, 20° C.), a refractive index anisotropy $\Delta n$ of 0.075 (wavelength 590 nm, 20° C.), a torsional modulus K2 of 7.0 pN and a nematic-isotropic phase transition temperature T(N-I) of about 76° C. was injected under vacuum, and the resulting assembly was sealed with a sealing agent formed of a ultraviolet-setting resin. Thus, a liquid crystal panel having a thickness of liquid crystal layer (gap) of 4.0 μm was prepared.

As the two polarizing plates 118 and 119 for sandwiching the TFT substrate and the color filter substrate, those obtained by absorbing iodine to a polyvinyl alcohol, followed by stretching were used, and were arranged in the manner of crossed Nicols. In this case, the absorption axis of the polarizing plate 119 arranged on the glass substrate 102 on the viewer side was made substantially parallel to the direction of the absorption axis of the alignment layer 132 formed on the color filter substrate. Normally close characteristics were employed, in which a dark display is obtained at a low voltage and a light display is obtained at a high voltage.

The retardation (Δnd) of the liquid crystal display panel was about 0.30 μm. A backlight source was arranged on the glass substrate 101 side of the above-mentioned liquid crystal display panel, and other circuits for driving the liquid crystals were provided to fabricate a liquid crystal display device. The display quality of the liquid crystal display device according to Example 12 of the present invention was evaluated, and a high-quality display having a contrast ratio of 620:1 was verified. The chromaticity coordinate variation between white display and black display was measured, and chrominance $\Delta u'v'$ was 0.029.

Example 13

Figure 9:
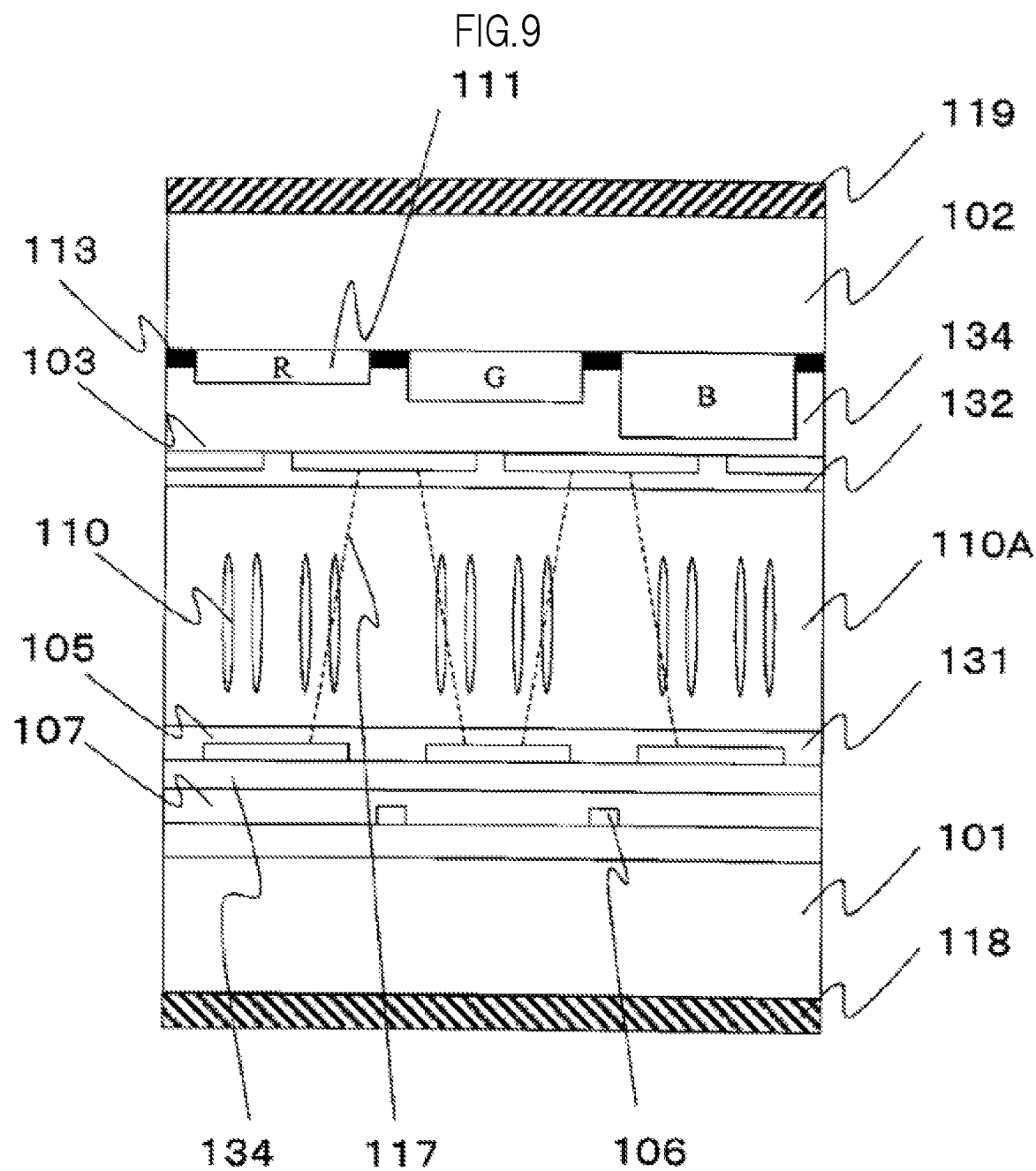
FIG. 9 is a schematic cross-sectional view illustrating a structure of a liquid crystal display device according to Example 13 of the present invention.

In Example 13 of the present invention relating to a manufacturing method for a liquid crystal display device, a uniaxial absorption anisotropy film is formed on the over coat film 134 made of acrylic resins formed on top of the color filter layer constituting a liquid crystal display device of a patterned vertical alignment (PVA) mode. Hereinafter, description is made of Example 13 of the present invention with reference to FIG. 9. FIG. 9 is a schematic cross-sectional view of the liquid crystal display device of a patterned vertical alignment (PVA) mode. In the manufacturing method for a liquid crystal display device according to Example 13 of the present invention, as the glass substrate 101 constituting the active matrix substrate and the glass substrate 102 constituting the counter substrate (color filter substrate), an alkalifree glass substrate having a thickness of 0.7 mm and the surface thereof is polished, is used.

On the glass substrate 102, a chromium film was formed into 160 nm, and a chromium oxide film was formed into 40 nm by continuous sputtering, and the light blocking portion 113 was formed through the following steps of an application of a positive resist, pre-bake, exposure, development, etching, peeling, and washing. Next, the color filter layer 111 was formed using color resists of red, green, and blue colors in accordance with a photolithography method as a usual method through the following steps of application, pre-bake, exposure, development, rinse, and post-bake. In this example, thicknesses of blue, green, and red colors were set to 3.0 µm, 2.7 µm, and 2.5 µm, respectively, but the film thickness may arbitrary be set in accordance with a desired color purity, or the thickness of the liquid crystal layer.

On top of the color filter layer 111, an over coat film 134 made of an acrylic resin, for leveling the steps of the respective pixels was formed. Exposure was performed using an i-ray of a high-pressure mercury lamp with an irradiation quantity of 200 mJ/cm$^2$, and then subjected to heating at 230° C. for 30 minutes to obtain the over coat film 134. The film thickness thereof was substantially 1.2 µm to 1.5 µm on the color pixel.

Next, ITO was evaporated by sputtering at 140 nm thickness, and heated at 240° C. for 90 minutes to crystallize, and through photographing step and etching processing, patterns of the common electrodes 103 were formed. Openings of the common electrodes 103 and openings of the pixel electrode 105 are allocated alternately therebetween. Next, columnar spacers are formed on top of the light blocking portion 113 sandwiched between pixels using a photosensitive resin by photolithography and etching as a usual method to have substantially 3.5 µm in height.

The scanning electrode (gate electrode) 104 (not shown) made of Mo/Al (molybdenum/aluminum) was formed on the active matrix substrate 101. At the same layer, a storage capacitor electrode may be formed using chromium or aluminum (not shown) The gate insulating film 107 was formed so as to cover those electrodes.

The signal electrode (drain electrode) 106 and the thin film transistor are formed as in Example 6 (not shown). As the protective insulating film for covering those, an organic insulating film 134 was formed by adding 3% by weight of Brilliant Yellow to an acrylic resin. On top thereof, the pixel electrodes 105 having an opening were formed using ITO. Note that, a transparent conductor such as IZO may be used therefor. The active matrix substrate with the number of pixels of 1024×3×768, constructed of 1024×3 (corresponding to R, G, and B) of the signal electrodes 106 and 768 of the scanning electrodes 104 was formed.

Next, as a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarizer obtained by laminating quartz plates. The irradiation was performed substantially perpendicularly to the substrate with irradiation energy of about 5 J/cm$^2$ at 230° C. At this time, the polarizing direction of the polarizing light, which is applied to the active matrix substrate, is set to a direction of the signal electrode. The absorption axis of the anisotropy layer is formed in a direction orthogonal to the transmission axis of an output side polarizing plate 119.

As a result, the active matrix substrate having the absorption axis in an orthogonal direction to the polarization direction of the irradiated polarized UV was obtained. The polarized UV spectrum of the TFT was measured, and found that the dichroic ratio was 2.58. In this example, the transmission axis of the output side polarizing plate 119 is in a short side direction of the substrate (same direction with signal electrode 106), and the absorption axis thereof is a long side direction of the substrate (direction of scanning electrode 104, not shown). However, in a case where the axis arrangement of the polarizing plate is changed, the axis may be determined based on the change.

Alignment layers 131 and 132 having perpendicular orientation are formed on the active matrix substrate and the color filter substrate, respectively, and a sealing agent is applied to peripheral portions of the substrates. A liquid crystal material having negative dielectric anisotropy was encapsulated thereinto by a one-drop-fill (ODF) method to form the liquid crystal layer 110A, to thereby fabricate the liquid crystal panel. The polarizing plates 118 and 119 were, as described above, made orthogonal to each other, namely, the transmission axis of the input side polarizing plate 118 is arranged in the long side direction of the substrate, and the transmission axis of the output side polarizing plate 118 is arranged in the short side direction of the substrates. As the polarizing plate, there was used a viewing angle compensation polarizing plate provided with a birefringence film for compensating viewing angle characteristics. After that, a driving circuit, a backlight, and the like were connected to form a module, and the liquid crystal display device was obtained.

The display quality of the liquid crystal display device was evaluated, and a contrast ratio was 800:1 over almost entire surface of the substrate. Further, the chrominance Δu'v' between black display and white display was 0.023. As a result, it was confirmed that the excellent display quality was obtained.

Note that, in this example, there was used the liquid crystal display device of PVA mode, in which a notched pattern of ITO was used. However, in a case of a multi-domain vertical alignment (MVA) mode, in which ribs are formed of the color filter substrate, after the formation of ITO, the process proceeds to a process of forming the columnar spacers after ribs forming process. The formation of anisotropy may be made in the same manner as in this example.

Comparative Example 3

In Comparative Example 3, in the liquid crystal display device of the patterned vertical alignment (PVA) mode described in Example 13, the liquid crystal display device was fabricated in the same manner as in Example 8 except that Brilliant Yellow was not added to an organic insulating film 134 formed on the active matrix substrate side. The display quality of the liquid crystal display device was evaluated, and a contrast ratio was 480:1 over almost entire surface of the substrate. Further, the chrominance Δu'v' between black display and the white display was 0.045.

Example 14

Figure 10:
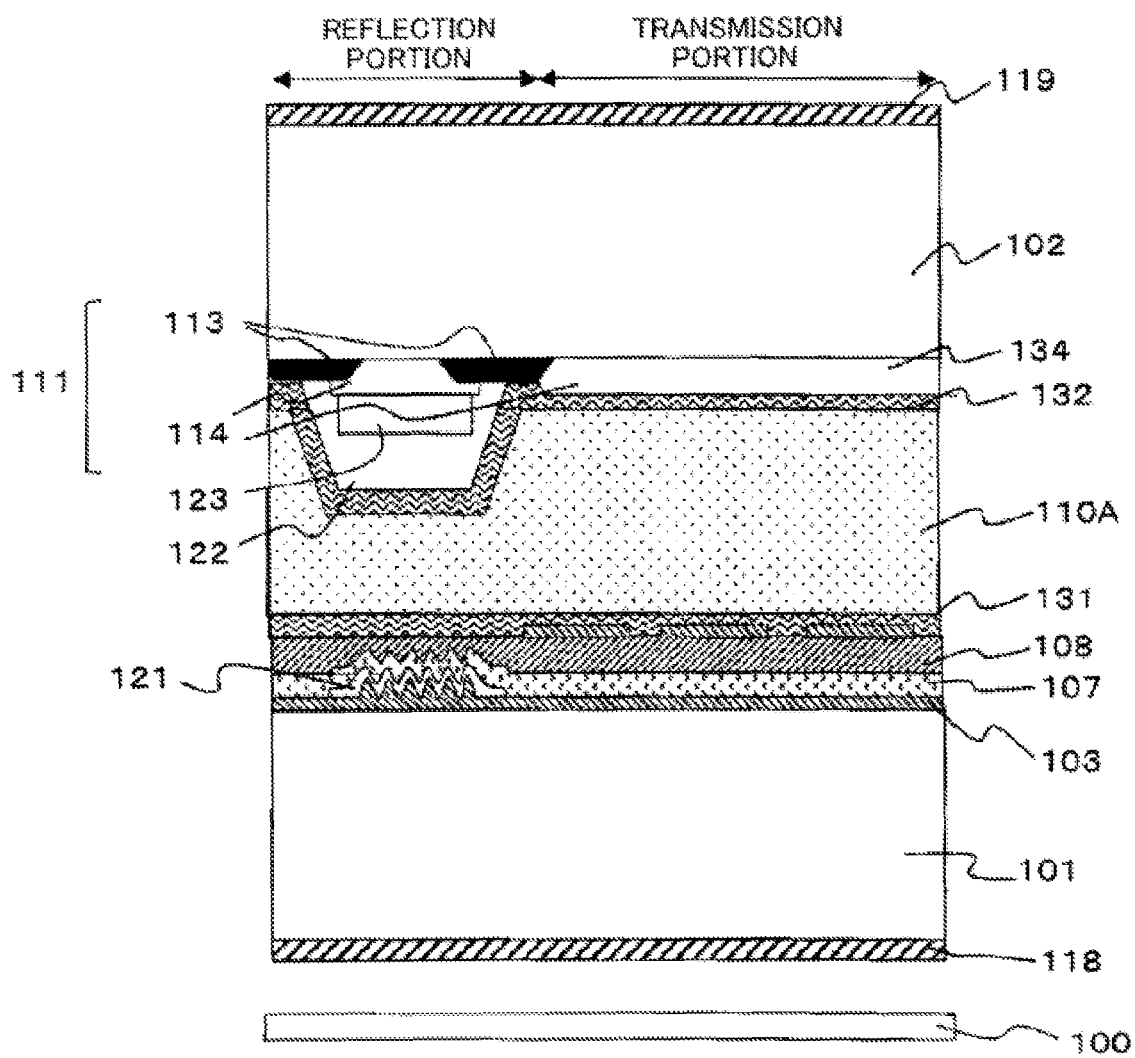
FIG. 10 is a schematic cross-sectional view of a conventional semi-transmissive liquid crystal display device.

Next, description is made of Example 14 relating to the liquid crystal display device of the present invention. In Example 14, the present invention is applied to a semi-transmissive liquid crystal display device. FIG. 10 illustrates a conventional semi-transmissive liquid crystal display device. In the semi-transmissive liquid crystal display device, in order to match lengths of light paths in the refection portion and transmission portion, there is a need to form a step in a reflection portion. Because, in the reflection portion, an external light such as sunlight goes through the polarizing plate 119, and passes the liquid crystal layer 110A. After being reflected by a reflection plate, the external light goes through the liquid crystal layer again and reaches the polarizing plate 119. As a result, in order to match the length of the light path in the reflection portion with that of the transmission portion, the thickness of the liquid crystal layer in the reflection portion must be a half of that of the transmutation portion. In addition, in order to attain a normally black state which is the same as the transmutation portion, there is needed a phase difference plate to be provided. In the conventional semi-transmissive liquid crystal display device, which requires the formation of the step, there is a need to take a larger margin for joining the upper and lower substrates together, thereby being disadvantageous in an aperture ratio.

Figure 11:
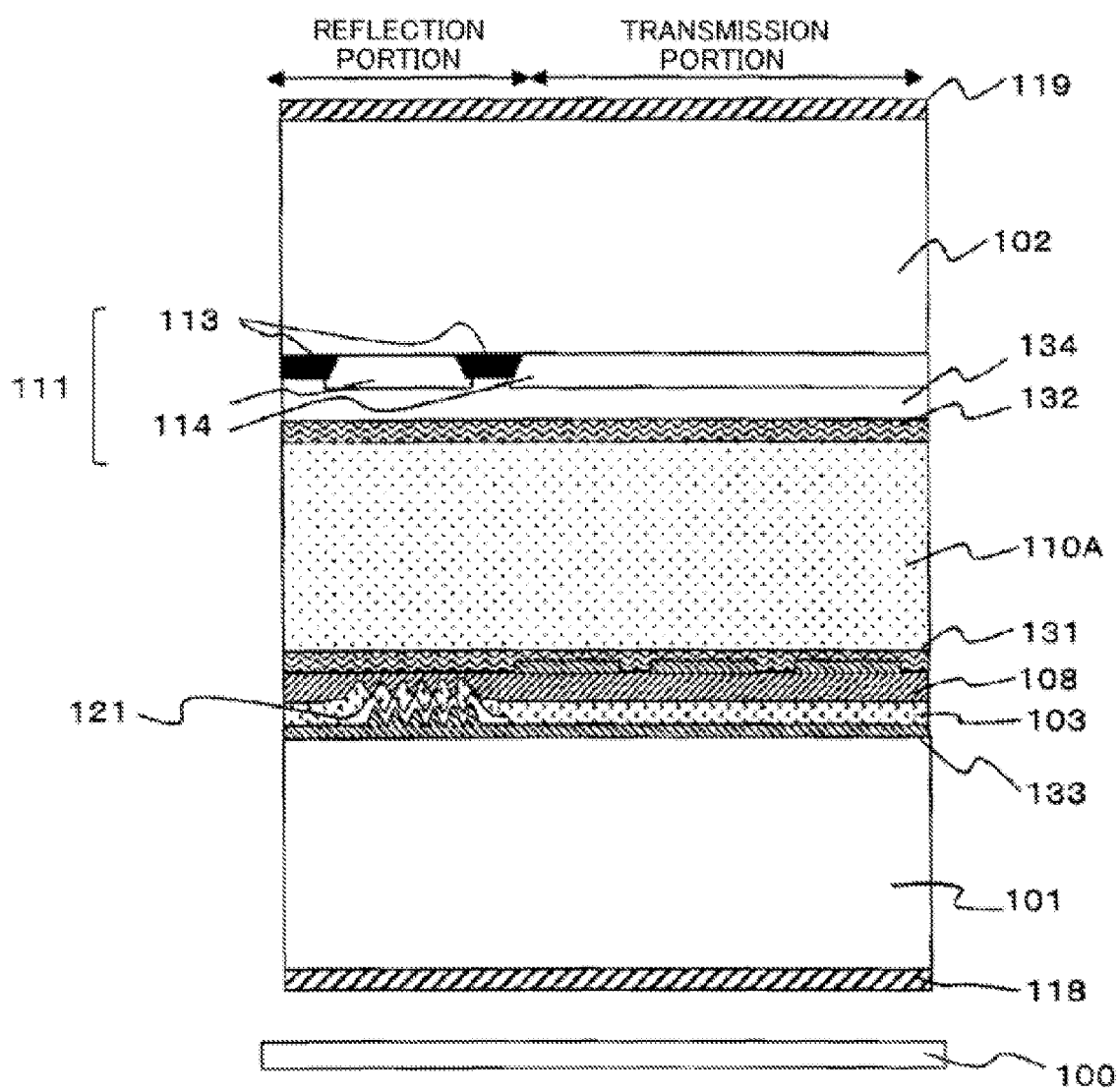
FIG. 11 is a schematic cross-sectional view of a semi-transmissive liquid crystal display device, which is Example 14 of the present invention.

In Example 14, a polarizing film having a cell incorporated therein is formed in the reflection portion. As a result, there may be obtained a semi-transmissive liquid crystal display device having no step and having a large aperture ratio. Hereinafter, description is made of Example 14 of the present invention. In Example 14, a uniaxial absorption anisotropy film was formed in the semi-transmissive liquid crystal display device. Hereinafter, Example 14 of the present invention is described with reference to FIG. 11. FIG. 11 is a schematic cross-sectional view illustrating a semi-transmissive liquid crystal display device of the present invention.

In manufacturing the liquid crystal display device according to Example 14 of the present invention, as the glass substrate 101 constituting the active matrix substrate and the glass substrate 102 constituting the counter substrate (color filter substrate), an alkalifree glass substrate having a thickness of 0.7 mm and the surface thereof is polished, is used. A light blocking portion 113 having a film thickness of 1.0 μm was formed on the glass substrate 102 constituting the color filter substrate using a black resist. Next, the color filter layer 111 formed of a pixel, which was partitioned by the light blocking portion 113 and arranged, was formed using a dye resist. The thicknesses of blue, green, and red colors were set to 3.0 μm, 2.7 μm, and 2.5 μm, respectively, but the film thickness may arbitrary be set in accordance with a desired color purity, or the thickness of the liquid crystal layer. After the formation of the color filter layer 111 using a color resist to which pigment was added, an over coat film 134 having a film thickness of 1.0 μm and made of an acrylic resin, for leveling the steps of the respective pixels was formed.

Next, on the surface of the color filter substrate, polyamic acid varnish formed of a 1:1 (by mole) mixture of p-phenylenediamine as diamine compound and 1,4-diaminopyridine, and 1,2,3,4-cyclobutanetetracarboxylic dianhydride as acid dianhydride was formed as the alignment layer by printing, and heat-treated at 220° C. for 30 minutes to form an alignment layer 132 formed of a dense polyimide film of about 80 nm.

On the other hand, formed on the glass substrate 101 constituting the active matrix substrate were a thin film transistor, a scanning electrode, a common electrode wiring, a signal electrode, and a pixel electrode (not shown). Those are all formed by patterning a chromium film. Note that, the chromium film having a low resistance and was easy for patterning was used for forming the common electrode and the pixel electrode used. However, an ITO film may be used to form a transparent electrode, thereby being capable of attaining higher brightness characteristics. On top thereof, after the formation of a transparent insulating organic film 133 at a thickness of 1.5 μm, irregularities were formed on the surface thereof to form a reflection portion 121 made of aluminium.

Further, to 6% by weight of polyimide acid solution, 3% by weight of Brilliant Yellow, 2% by weight of C.I. Direct Red 81, and 2% by weight of C.I. Direct Blue 151 were added and sufficiently dispersed, and the mixture was used to form a polyimide film 122 of about 200 nm on the reflection portion 121 by printing. Next, as a light source, a high-pressure mercury lamp was used. The ultraviolet light within a range of 330 nm to 600 nm was taken out from the light source through an interference filter, and was polarized into a linearly polarized light having a polarizing ratio of about 15:1 with the use of a pile polarlizer obtained by laminating quartz plates. The irradiation was performed substantially perpendicularly to the substrate with irradiation energy of about 5 J/cm$^2$ at 230° C. The absorption axis of the uniaxial absorption anisotropy layer is formed in a direction orthogonal to the transmission axis of the output side polarizing plate 119.

Next, the common electrode 103 was formed into a thickness of 100 nm using ITO by sputtering. After that, the protective insulating film 108 made of silicon nitride was formed to have a film thickness of 300 nm, and then the pixel electrode 105 was formed to form the active matrix substrate. After that, a polyamic acid varnish formed of a 1:1 (by mole) mixture of p-phenylenediamine as diamine compound and 1,4-diaminopyridine, and 1,2,3,4-cyclobutanetetracarboxylic dianhydride as acid dianhydride was adjusted so as to have a resin concentration of 5% by weight, an NMP concentration of 60% by weight, a γ-butyllactone concentration of 20% by weight and a butyl Cellosolve concentration of 15% by weight. This mixture was formed by printing as the alignment film on the above-mentioned active matrix substrate, and subjected to imidization by heat treatment at 220° C. for 30 minutes. Thus, a dense polyimide alignment layer 131 of about 80 nm was formed.

The obtained active matrix substrate has an absorption axis in a direction orthogonal to the polarizing direction of the irradiated polarized UV. The spectrum of the polarized UV was measured, and the dichroic ratio was 5.38. In this example, the transmission axis of the output side polarizing plate 118 is in a short side direction of the substrate (same direction with signal electrode 106), and the absorption axis thereof is a long side direction of the substrate (direction of scanning electrode 104, not shown). However, in a case where the axis arrangement of the polarizing plate is changed, the axis may be determined based on the change.

Alignment layers 131 and 132 having perpendicular orientation are formed on the active matrix substrate and the color filter substrate, respectively, and a sealing agent is applied to peripheral portions of the substrates. A liquid crystal material having negative dielectric anisotropy was encapsulated thereinto by a one-drop-fill (ODF) method to form the liquid crystal layer 110A, to thereby fabricate the liquid crystal panel. The polarizing plates 118 and 119 were, as described above, made orthogonal to each other, namely, the transmission axis of the input side polarizing plate 118 is arranged in the long side direction of the substrate, and the transmission axis of the output side polarizing plate 118 is arranged in the short side direction of the substrates. As the polarizing plate, there was used a viewing angle compensation polarizing plate provided with a birefringence film for compensating viewing angle characteristics. After that, a driving circuit, a backlight, and the like were connected to form a module, and the liquid crystal display device was obtained.

The display quality of the obtained liquid crystal display device was evaluated. The contrast ratio of the transmission portion was 650:1, and the contrast ratio of the transmission portion was 10:1. The liquid crystal display of the present invention exhibits the contrast ratio more than the contrast ratio (5:1) of the conventional semi-transmissive liquid crystal display device. The semi-transmissive liquid crystal display device of the present invention was compared with the conventional semi-transmissive liquid crystal display device in terms of the aperture ratio. The semi-transmissive liquid crystal display device of the present invention was improved in the aperture ratio by about 13% compared to the conventional semi-transmissive liquid crystal display device.

While there have been described what are at present considered to be certain examples of the invention, it will be understood that various modifications may be made thereto, and it is intended that the appended claims cover all such modifications as fall within the true spirit and scope of the invention.

What is claimed is:

1. A liquid crystal display device, comprising:
   a pair of substrates;
   a polarizing plate arranged on at least one of the pair of substrates;
   a liquid crystal layer arranged between the pair of substrates; and
   a group of electrodes formed on at least one of the pair of substrates, for applying an electric field to the liquid crystal layer,
   wherein at least one of the pair of substrates has a uniaxial absorption an isotropy;
   wherein the polarizing plate includes a polarizing plate protective film and an adhesive layer for bonding at least one of the pair of substrates and the polarizing plate;
   wherein at least one of the pair of substrates, the polarizing plate protective film, and the adhesive layer includes a pigment added thereto;
   wherein the at least one of the pair of substrates, the polarizing plate protective film, and the adhesive layer which includes the pigment added thereto has a dichroic ratio of at least 2;
   wherein at least one of the pair of substrates, the polarizing plate protective film, and the adhesive layer which includes the pigment added thereto has a region where an absorbance of an absorption axis is at least 0.2; and
   wherein a difference of absorbances between an absorption axis and a transmission axis is at least 0.1, which is shown by the at least one of the pair of substrates having the uniaxial absorption anisotropy.

2. A liquid crystal display device according to claim 1, wherein the at least one of the pair of substrates has the uniaxial absorption anisotropy in a wavelength range of 380 nm to 780 nm.

3. A liquid crystal display device according to claim 1, wherein a region where the dichroic ratio is at least 2 is in a wavelength range of 550 nm to 780 nm of the at least one of the pair of substrates having the uniaxial absorption anisotropy.

4. A liquid crystal display device according to claim 1, wherein a region where the dichroic ratio is at least 2 is in a wavelength range of 450 nm to 680 nm of the at least one of the pair of substrates having the uniaxial absorption anisotropy.

5. A liquid crystal display device according to claim 1, wherein a region where the dichroic ratio is at least 2 is in a wavelength range of 380 nm to 550 nm of the at least one of the pair of substrates having the uniaxial absorption anisotropy.

6. A liquid crystal display device according to claim 2, wherein the region where an absorbance of an absorption axis is at least 0.2 is in a wavelength range of 550 nm to 780 nm, which is shown by the at least one of the pair of substrates having the uniaxial absorption anisotropy.

7. A liquid crystal display device according to claim 2, wherein the region where an absorbance of an absorption axis is at least 0.2 is in a wavelength range of 450 nm to 650 nm, which is shown by the at least one of the pair of substrates having the uniaxial absorption anisotropy.

8. A liquid crystal display device according to claim 2, wherein a region where an absorbance of an absorption axis in a wavelength range of 380 nm to 550 nm is at least 0.2, which is shown by the having the uniaxial absorption anisotropy.

9. A liquid crystal display device according to claim 2, wherein the difference of absorbances between the absorption axis and the transmission axis in a wavelength range of 550 nm to 780 nm.

10. A liquid crystal display device according to claim 2, wherein the difference of absorbances between the absorption axis and the transmission axis is in a wavelength range of 450 nm to 650 nm.

11. A liquid crystal display device according to claim 2, wherein the difference of absorbances between the absorption axis and the transmission axis in a wavelength range of 370 nm to 550 nm.

12. A liquid crystal display device according to claim 2, wherein a maximum value of an absorbance in a wavelength range of 380 nm to 780 nm, which is shown by the at least one of the pair of substrates having the uniaxial absorption anisotropy locates in a wavelength range of 380 nm to 550 nm.

13. A liquid crystal display device according to claim 1, wherein the at least one of the pair of substrates is formed of a resin with the pigment added thereto.

14. A liquid crystal display device according to claim 13, wherein the uniaxial absorption anisotropy of the at least one of the pair of substrates is caused by irradiation of substantially linearly polarized light and/or being stretched.

15. A liquid crystal display device according to claim 14, wherein the pigment comprises a photoisomerization compound.

16. A liquid crystal display device according to claim 13, wherein an absorption axis of the at least one of the pair of substrates having the uniaxial absorption anisotropy is substantially parallel or perpendicular to one of absorption axes of a pair of polarizing plates.

17. A liquid crystal display device according to claim 1, wherein an alignment layer is disposed between the liquid crystal layer and the group of electrodes, and the alignment layer is added with pigment.

18. A liquid crystal display device according to claim 1, wherein the polarizing plate protective film has the pigment added thereto.

19. A liquid crystal display device according to claim 1, wherein the adhesive layer has the pigment added thereto.

* * * * *